(12) United States Patent
Kaiser et al.

(10) Patent No.: US 11,182,401 B1
(45) Date of Patent: Nov. 23, 2021

(54) DIGITAL PROCESSING SYSTEMS AND METHODS FOR MULTI-BOARD MIRRORING WITH AUTOMATIC SELECTION IN COLLABORATIVE WORK SYSTEMS

(71) Applicant: MONDAY.COM LTD., Tel Aviv (IL)

(72) Inventors: Oron Kaiser, Giv'atayim (IL); Oron Morad, Or Yehuda (IL); Dor Yehuda, Ramat Gan (IL); Ziv Ventura, Giv'atayim (IL); Shiri Levin, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/243,729

(22) Filed: Apr. 29, 2021

Related U.S. Application Data

(63) Continuation of application No. PCT/IB2021/000297, filed on Apr. 28, 2021, and a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/122,439, filed on Dec. 7, 2020, provisional application No. 63/121,803, filed on Dec. 4, 2020, provisional application No. 63/078,301, filed on Sep. 14, 2020, provisional
(Continued)

(51) Int. Cl.
*G06F 16/248* (2019.01)
*G06F 16/2455* (2019.01)
*G06N 20/00* (2019.01)
*G06Q 10/10* (2012.01)

(52) U.S. Cl.
CPC ...... *G06F 16/248* (2019.01); *G06F 16/24564* (2019.01); *G06N 20/00* (2019.01); *G06Q 10/103* (2013.01)

(58) Field of Classification Search
CPC . G06F 16/248; G06F 16/24564; G06N 20/00; G06Q 10/103
USPC ........................................................ 707/722
See application file for complete search history.

(56) References Cited

U.S. PATENT DOCUMENTS

| | | | | |
|---|---|---|---|---|
| 7,290,048 B1 * | 10/2007 | Barnett | ............... | G06F 11/3495 709/223 |
| 2012/0110504 A1 * | 5/2012 | Bartolini | ............... | G06Q 10/06 715/810 |
| 2013/0167039 A1 * | 6/2013 | Howell | ............... | G06F 16/9535 715/748 |

* cited by examiner

*Primary Examiner* — Joshua Bullock
(74) *Attorney, Agent, or Firm* — Finnegan, Henderson, Farabow, Garrett & Dunner, LLP

(57) ABSTRACT

Systems, methods, and computer-readable media for generating higher level summary tablature based on lower level tablature are disclosed. The systems and methods may involve at least one processor configured to: receive a selection of at least one item contained on both a first board and a second board; detect a first type of information; detect a second type of information; detect a third type of information; detect a fourth type of information; analyze characteristics to ascertain that the first type of information is aggregable with the third type of information, and that the second type of information is aggregable with the fourth type of information; present the at least one item on a third board; and aggregate on the third board, the first type of information with the third type of information, and the
(Continued)

second type of information with the fourth type of information.

20 Claims, 19 Drawing Sheets

Related U.S. Application Data application No. 63/019,396, filed on May 3, 2020, provisional application No. 63/148,092, filed on Feb. 10, 2021, provisional application No. 63/018,593, filed on May 1, 2020.

FIG. 3A

Project

Main Table ∨ | New Item ∨ | Q Search @ Person ▽ Filter ↕ Sort ...

| | Link | Person | Status | Date | Text | Timeline | Tags | Numbers | Formula | Check |
|---|---|---|---|---|---|---|---|---|---|---|
| Task 1 | Item 1 +1 | ZV | | Jan 1-6 | Hello1, Hello2, Hello3 | Dec 8-Feb 12 | #first #second...#third | 1 | 6,000 | ✓ 2/3 |
| Task 2 | Item 2 +5 | ZV | | Jan 1 – Feb 13 | Hello2, Hello3, Hello4... | Dec 8-Feb 18 | #first #second +2 | 1 | 15,000 | ✓ 3/6 |
| Task 3 | Item 1 | ZV | Done | Jan 1 | Hello1 | Jan 1-15 | #first | 1 | 1,000 | ✓ |

FIG. 3B

Project

Main Table ∨ | New Item ∨ | Q Search @ Person ▽ Filter ↕ Sort ...

| | Check | Rating | Files | Votes | Phone | TimeTrack | Dropdown | Email | Group |
|---|---|---|---|---|---|---|---|---|---|
| Task 1 | ✓ 2/3 | ★ 2/5 | | Total votes: 1 | 1234567890, 123456... | 0h 14m | Item 1 +2 | name@email.com... | Group Title, Group Tit... |
| Task 2 | ✓ 3/6 | ★ 3/5 | | Total votes: 2 | 1234567890, 123456... | 1032h 27m | Item 1 +4 | name@email.com... | Group Title, Group Tit... |
| Task 3 | ✓ | ★☆☆☆☆ | | 1 | 1234567890 | 14m 22s | Item 1 | name@email.com... | Group Title |

Project 1

⊞ Main Table ⌄     🔍 Search  @ Person  ▽ Filter  ↕ Sort ...

[ New Item ⌄ ]

| | Due Date | Person | Status |
|---|---|---|---|
| Task 1 | Feb 8 | Person 1 | Done |
| Task 2 | Feb 2 | Person 2 | Working On It |
| Task 3 | Feb 2 | Person 3 | Stuck |

Project 2

⊞ Main Table ⌄     🔍 Search  @ Person  ▽ Filter  ↕ Sort ...

[ New Item ⌄ ]

| | Due Date | | Status |
|---|---|---|---|
| Task 1 | Jan 13 | | |
| Task 2 | Feb 2 | | Stuck |
| Task 3 | Feb 2 | | Done |

DIGITAL PROCESSING SYSTEMS AND METHODS FOR MULTI-BOARD MIRRORING WITH AUTOMATIC SELECTION IN COLLABORATIVE WORK SYSTEMS

CROSS-REFERENCE TO RELATED APPLICATIONS

This application is based on and claims benefit of priority of U.S. Nonprovisional patent application Ser. No. 17/242, 452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Consistent with disclosed embodiments, systems, methods, and computer readable media for generating high level summary tablature based on lower level tablature are disclosed. Systems, methods, devices, and non-transitory computer readable media may involve at least one processor configured to electronically access first data associated with a first board. The at least one processor may be further configured to electronically access second data associated with a second board and to perform electronic semantic analysis to identify a portion of the first data associated with the first board and a portion of the second data associated with the second board that share a similarity. The at least one processor may be further configured to consolidate in a third board reflecting a similarity consolidation, the identified first portion and the identified second portion. In addition, the at least one processor may be further configured to summarize the first portion and the second portion, and to aggregate the summarized first portion and the summarized second portion to form an aggregated summary. The at least one processor may be further configured to present on the third board the aggregated summary in a manner associating the aggregated summary with the similarity consolidation.

Consistent with disclosed embodiments, systems, methods, and computer readable media for generating high level summary tablature based on lower level tablature are disclosed. Systems, methods, devices, and non-transitory computer readable media may involve at least one processor that may be configured to electronically receive a first selection of at least one item contained on both a first board and a second board and to electronically receive a second selection of a first type of information presented on the first board. In some embodiments, the first type of information may be associated with a first heading. The at least one processor may be further configured to electronically receive a third selection of a second type of information presented on the first board. In some embodiments, the second type of information may be associated with a second heading. The at least one processor may be further configured to electronically receive a fourth selection of a third type of information presented on the second board. In some embodiments, the third type of information may be associated with a third heading. In some embodiments, the first type of information may be aggregable with the third type of information in a first aggregation. In some embodiments, the first heading may differ from the third heading. The at least one processor may be further configured to electronically receive a fifth selection of a fourth type of information presented on the second board. In some embodiments, the fourth type of information may be associated with a fourth heading. In some embodiments, the second type of information may be aggregable with the fourth type of information in a second aggregation. In some embodiments, the second heading may be different from the fourth heading. The at least one processor may be further configured to electronically generate a summary board including the at least one item. In some embodiments, the summary board may associate with the at least one item the first aggregation and the second aggregation. The at least one processor may be further configured to electronically associate one of the first heading and the third heading with the first aggregation. The at least one processor may be further configured to electronically associate one of the second heading and the fourth heading with the second aggregation.

Consistent with some disclosed embodiments, systems, methods, and computer readable media for generating high level summary tablature based on lower level tablature are disclosed. Systems, methods, devices, and non-transitory computer readable media may include at least one processor that may be configured to receive a selection of at least one item contained on both a first board and a second board. The at least one processor may be further configured to detect a first type of information presented on the first board. In some embodiments, the first type of information may be associated with a first heading. The at least one processor may be further configured to detect a second type of information presented on the first board. In some embodiments, the second type of information may be associated with a second heading. The at least one processor may be further configured to detect a third type of information presented on the second board. In some embodiments, the third type of information may be associated with a third heading different from the first heading. The at least one processor may be further configured to detect a fourth type of information presented on the second board. In some embodiments, the fourth type of information may be associated with a fourth heading different from the second heading. The at least one processor may be further configured to analyze characteristics of the first type of information, the second type of information, the third type of information, and the fourth type of information, to ascertain that the first type of information is aggregable with the third type of information, and that the second type of information is aggregable with the fourth type of information. The at least one processor may be further configured to present the at least one item on a third board. The at least one processor may be further configured to aggregate on the third board, in association with the at least one item, the first type of information with the third type of information, and the second type of information with the fourth type of information.

BRIEF DESCRIPTION OF THE DRAWINGS

FIGS. 3A and 3B, illustrate exemplary tablature, consistent with some embodiments of the present disclosure.

FIG. 5 illustrates an exemplary first board, consistent with some embodiments of the present disclosure.

FIG. 6 illustrates an exemplary second board, consistent with some embodiments of the present disclosure.

FIG. 7 illustrates an exemplary third board, consistent with some embodiments of the present disclosure.

FIG. 9 illustrates an exemplary display generated as a result of an activation of a link in a cell, consistent with some embodiments of the present disclosure.

FIG. 10 illustrates another exemplary display generated as a result of an activation of a link in a cell, consistent with some embodiments of the present disclosure.

FIG. 12 illustrates an exemplary first board, consistent with some embodiments of the present disclosure.

FIG. 13 illustrates an exemplary second board, consistent with some embodiments of the present disclosure.

FIG. 15 illustrates an exemplary display generated as a result of an interaction with an indicator, consistent with some embodiments of the present disclosure.

FIG. 16 illustrates another exemplary display generated as a result of an interaction with an indicator, consistent with some embodiments of the present disclosure.

FIG. 18 illustrates an exemplary first board, consistent with some embodiments of the present disclosure.

FIG. 19 illustrates an exemplary second board, consistent with some embodiments of the present disclosure.

FIG. 22 illustrates an exemplary display generated as a result of an interaction with an indicator, consistent with some embodiments of the present disclosure.

FIG. 23 illustrates another exemplary display generated as a result of an interaction with an indicator, consistent with some embodiments of the present disclosure.

DETAILED DESCRIPTION

Figure 1:
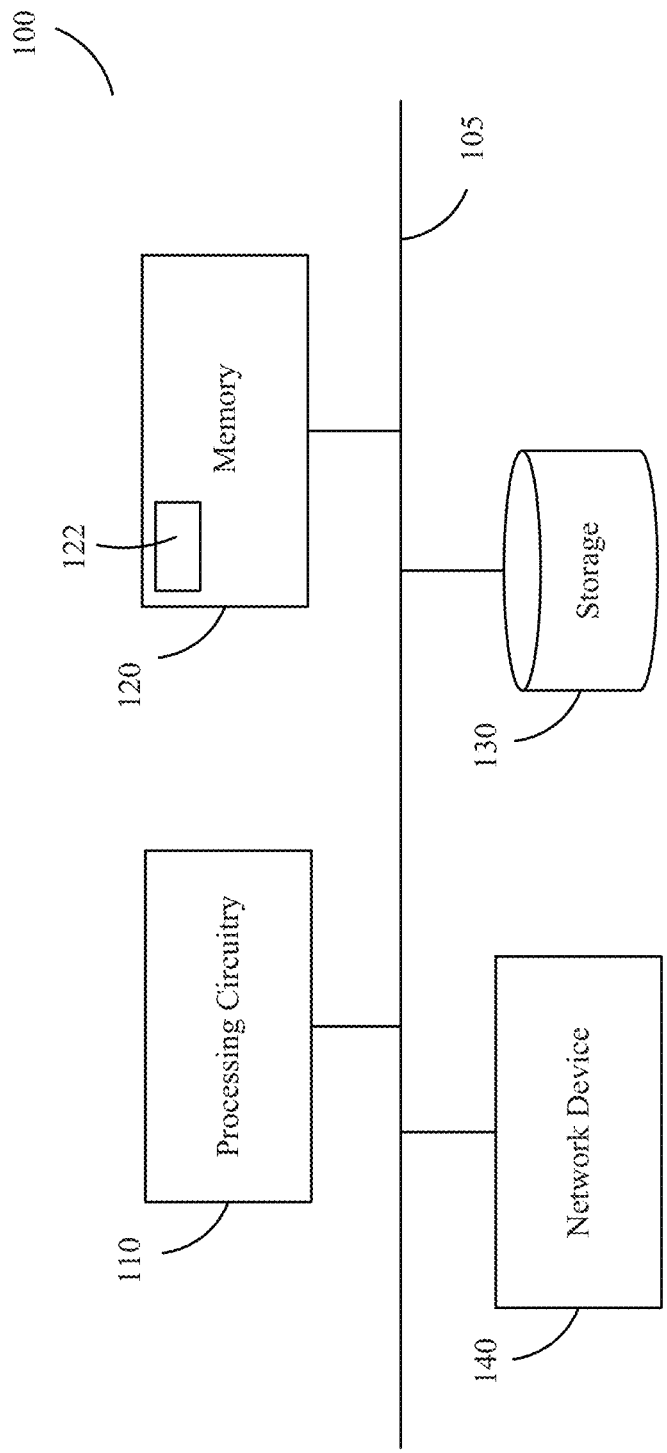
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underlie the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
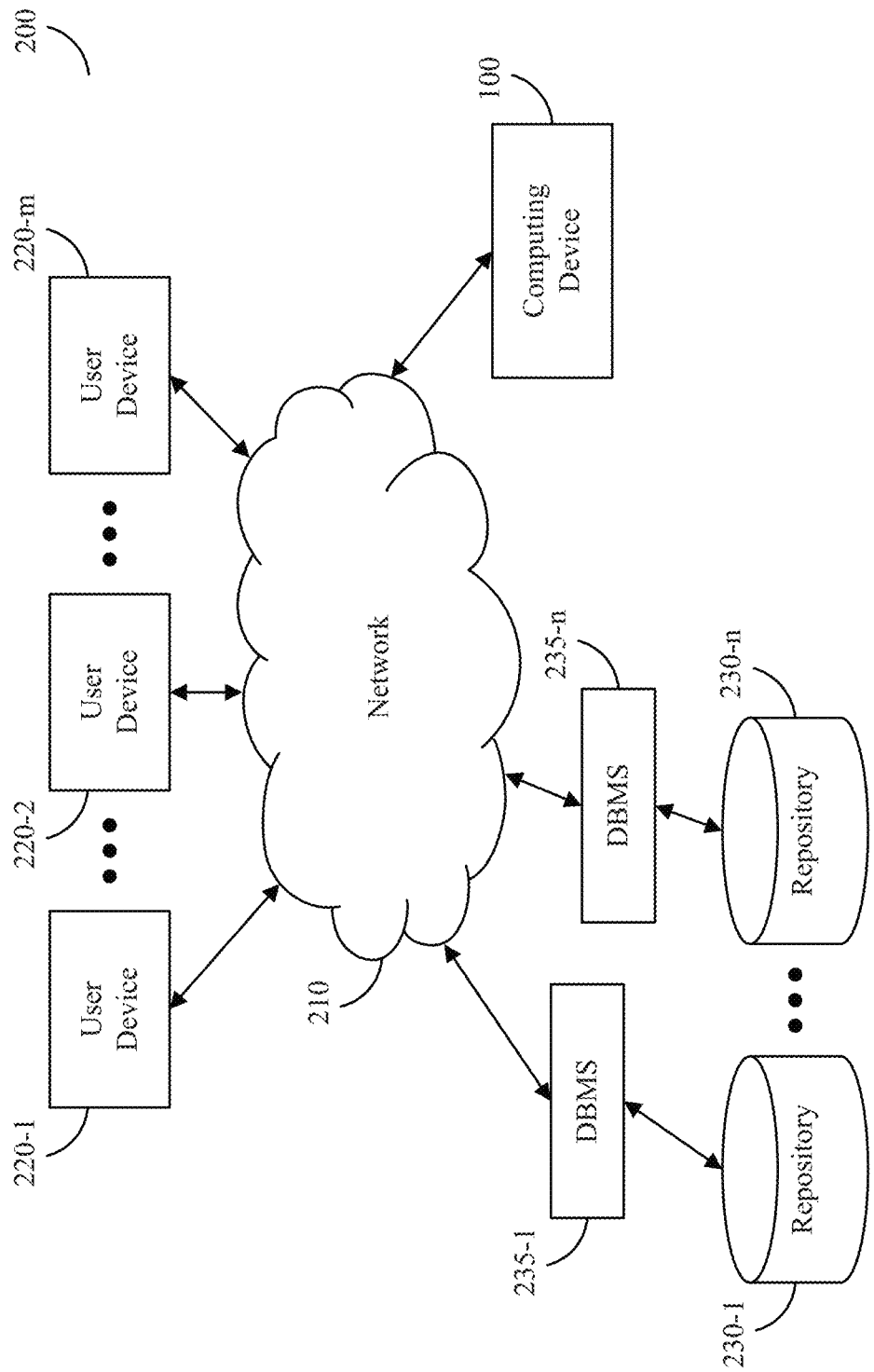
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Consistent with disclosed embodiments, systems, methods, and computer readable media for generating high level summary tablature based on lower level tablature are disclosed. Computerized systems and methods for generating high level summary tablature provides several advantages over extant systems and methods that rely on inefficient and inaccurate processes for determining similarity in tablature data. Extant systems and methods for determining a similarity in data, for example, may fail to analyze data types, data content, or table structure information when making such a determination. Extant approaches, moreover, may require a user to manually identify similar information. In addition, extant approaches may fail to identify data as similar, or may incorrectly identify data as similar, due to a lack of analysis of relevant information. The disclosed systems and methods, on the other hand, may perform semantic analysis of data associated with lower level tablature to determine a similarity and to subsequently aggregate the similar data in a streamlined manner. In addition, the disclosed systems and methods may present a summary of the similar data, allowing a user to view the aggregated data in a more convenient manner than with extant systems and methods. Additionally, the disclosed systems and methods may automatically generate an indication of the similarity consolidation, providing an intuitive representation of the similarity. Accordingly, the systems and methods disclosed herein may provide more seamless processes to aggregate similar data than with extant approaches. Further, the disclosed computerized systems and methods may provide more robust and accurate processes to identify similar data than with extant systems and methods.

The systems and methods described herein may be implemented with the aid of at least one processor or non-transitory computer readable medium, such as a CPU, FPGA, ASIC, or any other processing structure(s) or storage medium, as described herein. Tablature may refer to any structure for presenting data in an organized manner, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure.

As would be appreciated by a skilled artisan, however, the disclosed embodiments are not limited to any specific structure, but rather may be practiced in conjunction with any desired organizational arrangement. When used in conjunction with a workflow management application, tablature may include any information associated with one or more tasks, such as one or more status values, projects, countries, persons, teams, progresses, a combination thereof, or any other information related to a task.

For example, FIGS. 3A and 3B, illustrate exemplary tablature 300a and 300b, consistent with embodiments of the present disclosure. In some embodiments, tablature 300a and 300b and other information discussed in connection with other figures may be presented using a computing device (e.g., computing device 100 illustrated in FIG. 1) or software running thereon. The presentation may occur via a display associated with computing device 100 or one or more of the user devices 220-1 to 220-m in FIG. 2. As shown in FIGS. 3A and 3B, tablature 300a and 300b may include multiple rows and columns with cells at intersections of rows and columns. In the embodiment shown in FIGS. 3A and 3B, tablature 300a and 300b may include information associated with one or more tasks, such as "Task 1," "Task 2," and "Task 3." Each cell in tablature 300a and 300b may include information associated with the task with which it is associated, such as links, persons, status, date, text, timeline, tags, numbers, formulas, checks, ratings, files, votes, phones, time tracking, multi-selection or dropdown information, emails, groups, and any other suitable information, as shown in FIGS. 3A and 3B. Tablature may contain other information associated with a task, or any other kind of information not related to tasks or workflow management information.

A high level summary tablature may be utilized to present data derived from one or more other tablature or other sources of data, such as one or more graphical representations, dashboards, widgets, tables or tabulations, flowcharts, maps, bar charts, circle charts, pie charts, alphanumeric characters, symbols, pictures, a combination thereof, or any other content of information. A summary tablature may include information from one or more sources that is in a same or a condensed manner as compared to the one or more sources. The summary information may be identical to information contained in the source or may be shortened, abbreviated, modified, or otherwise altered while maintaining meaning and/or context. For example, in embodiments where summary tablature represents data contained in one or more source tablature, a cell in the summary tablature may depict data contained in cells in each of the one or more source tablature, such as by combining one or more task names, statuses, deadlines, client information, projects, persons, teams, progresses, a combination thereof, or any other information contained in the one or more source tablature. In some embodiments, the summary tablature may be presented as a combination of graphical and alphanumeric indications.

Figure 4:
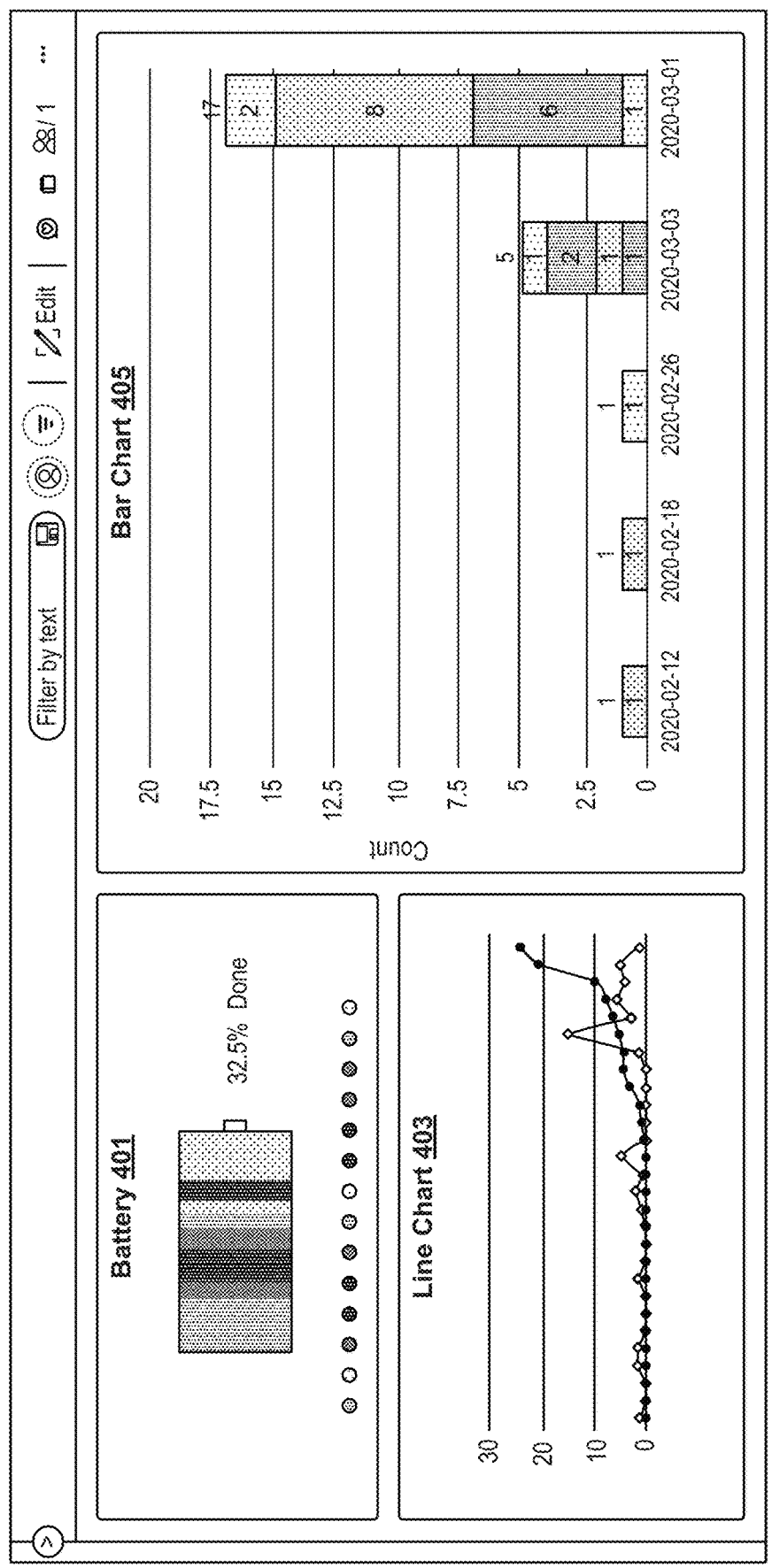
FIG. 4 illustrates exemplary summary tablature, consistent with some embodiments of the present disclosure.

For example, FIG. 4 illustrates exemplary summary tablature 400, consistent with embodiments of the present disclosure. By way of example only, summary view 400 may include a depiction of a battery 401 that represents overall progress information of lower level tablature (not shown in FIG. 4), a line chart 403 that represents information of planned progress versus actual progress extracted from the lower level tablature, and a bar chart 405 that represents information of status by week extracted from the lower level tablature.

The depiction of a battery 401 shows a battery-shape representation that consolidates all of the statuses of the tasks included in the lower level tablature, such as "done," "in progress," "stuck," "waiting," "delayed," or any other status value in the lower level tablature. As illustrated in this example, the depiction of a battery 401 includes the text "32.5% done" reflecting that 32.5% of the tasks associated with the statuses are "Done." That is, of all the tasks included in the lower level tablature, 32.5% are completed. This text may be a default or may be configured to present the percentage makeup or any of the status values in the lower level tablature.

The exemplary line chart 403 shows two lines, a line of black dots and a line of circle dots. Each black dot of the line of black dots may represent a planned progress of a task included in the lower level tablature, and each circle dot of the line of circle dots may represent an actual progress of a task included in the lower level tablature. The line chart may be a default or may be configured according to user preference.

The exemplary bar chart 405 shows five bars, each bar including one or more statuses associated with a single week (e.g., the week of "2020-02-12," the week of "2020-02-18," and so on). That is, each bar may represent all the statuses updated or changed within one week for their associated tasks. The bar chart may be a default or may be configured according to user preference.

The at least one processor may be configured to electronically access first data associated with a first board, consistent with disclosed embodiments. A board may include a table with items (e.g., individual items presented in horizontal rows) defining objects or entities that are managed in the platform (such as task, project, client, deal, or other information), as discussed above. A board may include two or more different boards or tables, or may directly or indirectly access data from one or more other boards, tables, or other sources. Electronically accessing information may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provides a medium for exchanging data. In some embodiments, accessing information may include adding, editing, deleting or otherwise modifying information directly or indirectly from the board.

For example, FIG. 5, illustrates an exemplary first board 500 the data of which may be electronically accessed, consistent with embodiments of the present disclosure. As shown in FIG. 5, first board 500 may include a table having multiple horizontal rows, such as rows 501 representing "Task 1," "Task 2," and "Task 3." Each row in first board 500 may include information associated with each task, such as "Due Date" column 503 representing a deadline of the task, "Person" column 505 representing individuals associated with the task, and "Status" column 507 representing a current condition of the task. First board 500 may include other information associated with a task, or any other kind of information not related to tasks or workflow management information.

The at least one processor may be configured to electronically access second data associated with a second board, consistent with disclosed embodiments. Accessing second data associated with a second board may be done in the same or similar manner as accessing first data associated with a first board, as discussed above. In some embodiments, the second board may be the same as the first board, and may include two or more different boards or tables. The first board and the second board may be associated with the same or different application, environment, user, or any other entity or sub-system of the system. For example, in some embodiments, the first board and the second board may belong to the same user. In other embodiments, the first board may be associated with a first user, and the second board may be associated with a second user. In other embodiments, a board may be associated with two or more users, and each user may add, edit, or delete information as desired, resulting in a first board and a second board that are variations of one another.

For example, FIG. 6, illustrates an exemplary second board 600 the data of which may be electronically accessed, consistent with embodiments of the present disclosure. In FIG. 6, second board 600 may include a table comprising multiple horizontal rows, such as rows 601 representing "Task 1," "Task 2," and "Task 3." Each row in second board 600 may include information associated with each task, such as "Due Date" column 603 representing a deadline of the task, and "Status" column 607 representing a current condition of the task. Second board 600 may include other information associated with a task, or any other kind of information not related to tasks or workflow management information. As can be appreciated from comparing FIG. 5 with FIG. 6, first board 500 and second board 600 may include the same, similar, or different information. In FIGS. 5 and 6, for example, both boards include due date and status information, as represented by "Due Date" columns 503 and 603 and "Status" columns 507 and 607. However, only first board 500 in FIG. 5 includes information on individuals associated with a task, as represented by "Person" column 605.

In some embodiments, the first data and the second data may include row headings. In such embodiments, the first board and the second board may include one or more tablature having one or more rows having one or more headings defining or indicating a category or attribute associated with the information in that row. A "row," may refer to one or more of a horizontal presentation, a vertical presentation, or both, as discussed above. For example, in embodiment where the first board and the second board include workflow management information, vertical or horizontal rows may have headings associated with a task such as a name, status, project, country, person, team, progress, or any other feature or characteristic that may be associated with the information associated with a particular row.

For example, in FIGS. 5 and 6, first board 500 and second board 600 may include row headings 501 and 601, respectively. As illustrated in FIGS. 5 and 6, each row heading may be associated with an individual task in a horizontal row, such as "Task 1," "Task 2," and "Task 3." A row heading may also be associated with a vertical row or column, however, such as the "Due Date" row heading for columns 503 and 603, the "Person" row heading for column 505, and the "Status" row heading for columns 507 and 607.

In some embodiments, the first data and the second data may include status information. Status information may refer to any state or condition associated with the first data and the second data, such as "done," "in progress," "stuck," "waiting," "delayed," or any other information indicating a current state or condition. In embodiments where the first board and the second board include workflow management information, the status information may be associated with one or more tasks, projects, goals, clients, deadlines, targets, or any other data for which a state or condition would be desirable.

For example, in FIGS. 5 and 6, first board 500 and second board 600 may include status information 507 and 607, respectively. As illustrated in FIGS. 5 and 6, status information may represent a current state of an individual task, such as "Done," "Working on it," and "Stuck." Other statuses or labels may be used depending on the task or other information included in the first board and the second board.

The at least one processor may be configured to perform electronic semantic analysis to identify a portion of the first data associated with the first board and a portion of the second data associated with the second board that share a similarity, consistent with disclosed embodiments. Semantic analysis may involve a computer process for drawing meaning from text. It may involve identifying relationships between individual words in a particular context within sentences, paragraphs, or whole documents by electronically analyzing grammatical structure and identifying relationships between particular words in a particular context. After semantic analysis is performed on first data in a first board and second data in a second board, the at least one processor can compare the results to determine a similarity. In some embodiments, semantic analysis may be performed by analyzing a data type associated with the first data and the second data. Data types may include text, numbers, calendar information, formulas, time, files, multi-select data, tags, check boxes, a combination thereof, or any other attribute or characteristic of information. In such embodiments, the system may determine whether the data type of the first data is the same or similar to the data type of the second data. For example, the first data may include one or more cells with a range of dates associated with a timeline, such as "December 8-February 12," and the second data may also include one or more cells with a range of dates associated with a timeline, such as "December 8-February 18." In such cases, the system may determine that the one or more timeline cells in the first data and the second data share a similarity because both have the same type of data, in this case calendar information. The system may arrive at the same result if the types of data of the first data and the second data are similar, such as numbers compared to formulas, numerical strings compared to numbers, persons compared to groups, emails compared to names, and any other data types that relate to one another. Conversely, the first data may include one or more cells including status information, such as "Done," and the second data may include one or more cells including telephone numbers associated with a person, such as "+123 45 678 9123." In such cases, the system may determine that the one or more status cells in the first data and the one or more telephone cells in the second data do not share a similarity because they do not share the same data type, in this case text and numbers (although in some embodiments there may be sufficient relationship between the two to constitute a similarity). Other data types and combinations may be used, as would be understood by a person having ordinary skill in the art.

In other embodiments, electronic semantic analysis may be performed by analyzing information contained in the first data and the second data. For example, in embodiments when the first board and the second board include workflow management information, the first data and the second data may include information associated with one or more tasks, such as one or more status values, projects, countries, persons, teams, progresses, a combination thereof, or any other information related to a task. In such embodiments, the system may determine whether the information of the first data is the same or similar to the information of the second data. For example, the first data may include one or more cells with a person associated with a task, such as "J. Smith," and the second data may also include one or more cells with a person associated with a task, such as "John Smith." In such cases, the system may determine that the one or more cells in the first data and the second data share a similarity because both include the same last name, in this case "Smith" and both have names that start with a "J." The system may arrive at the same result if the information in the first data and the second data share a commonality, such as being synonymous, falling under a common category, overlapping in content (e.g., having one or more letters, numbers, or other information in common), a combination thereof, or having any other likeness in nature or relationship. For example, the first data may include one or more cells with dates associated with a deadline, such as "February 6," and the second data may also include one or more cells with dates associated with a deadline, such as "August 8." In such cases, the system may determine that the one or more deadline cells in the first data and the second data share a similarity because both information fall under a common category, in this case months. Conversely, the first data may include one or more cells associated with a status, such as "Done," and the second data may include one or more cells associated with a person associated with a task, such as "J. Smith." In such cases, the system may determine that the one or more status cells in the first data and the one or more person cells in the second data do not share a similarity because there is no correlation between the word "Done" and the word "J. Smith" (although in some embodiments there may be sufficient relationship between the two to constitute a similarity). Other relationships and combinations may be used, as would be understood by a person having ordinary skill in the art.

In other embodiments, semantic analysis may be performed by analyzing structure information associated with the first board and the second board. Structure information may include data associated with rows, column, size, intractability, inputs, outputs, signals, operations, metadata, graphical representations, a combination thereof, or any other information associated with a board. In such embodiments, the system may determine whether the structure information of the first board is the same or similar to the structure of information in the second board.

In some embodiments, for example, the identified similarity between the first data and the second data may include common status information. For example, the first board may have a row heading labeled "Status" including one or more cells associated with a status, and the second board may also have a row heading labeled "Stage" including one or more cells associated with a status. In such cases, electronic semantic analysis may determine that "Status" and "Stage" have similar meanings and may determine that the one or more status cells in the first board and stage cells in the second board share a similarity as a result of the similar meaning. The system may arrive at the same result if the structural information of the first board and the second board share a commonality, such as being identical, otherwise synonymous, falling under a common category, overlapping in content (e.g., having one or more letters, numbers, or other information in common), a combination thereof, or having any other likeness in nature or relationship. In some embodiments, for example, the shared similarity may include a similarity between row headings. For example, the first board may include one or more cells associated with a row heading labeled "Project Status," and the second board may include one or more cells associated with a row heading labeled "Task Status." In such cases, the system may determine that cells associated with the two row headings share a similarity because both row headings have similar information, in this case "Status" information. Conversely, the first board may have a row heading labeled "Deadline" including one or more deadline cells associated with deadlines, such as "February 9," and the second board may have a row heading labeled "Persons" including one or more person cells associated with persons, such as "J. Smith." In such cases, the system may determine that the one or more deadline cells in the first board and the one or more person cells in the second board do not share a similarity because they do not share the same row heading information, in this case "Deadline" and "Persons" (although in some embodiments there may be sufficient relationship between the two to constitute a similarity). Other structure information and combinations may be used, as would be understood by a person having ordinary skill in the art.

It is to be understood that the above-referenced ways of performing semantic analysis are provided for illustration purposes only. The system may perform semantic analysis by employing all, some, a variation of, or none of the examples provided above. A person having ordinary skill in the art may utilize other methods of performing semantic analysis without departing from the scope and spirit of the claimed invention.

The at least one processor may be configured to consolidate in a third board reflecting a similarity consolidation, the identified first portion and the identified second portion, consistent with disclosed embodiments. Similarity consolidation may include presenting information from the identified first portion and the identified second portion in the same or a condensed manner in instances where there is a semantic likeness between the two. For example, the information may be identical or may be shortened, abbreviated, modified, expressed in a synonymous or related manner, or otherwise differing while maintaining a related meaning. The third board may be a table with items (e.g., individual items presented in horizontal rows) defining objects or entities that are managed in the platform (such as task, project, client, deal, or other information), as discussed above. In embodiments where the first board and the second board include tables, for example, the third board may also include a table with the same or similar row headings and column headings as the first board and the second board.

Figure 7:
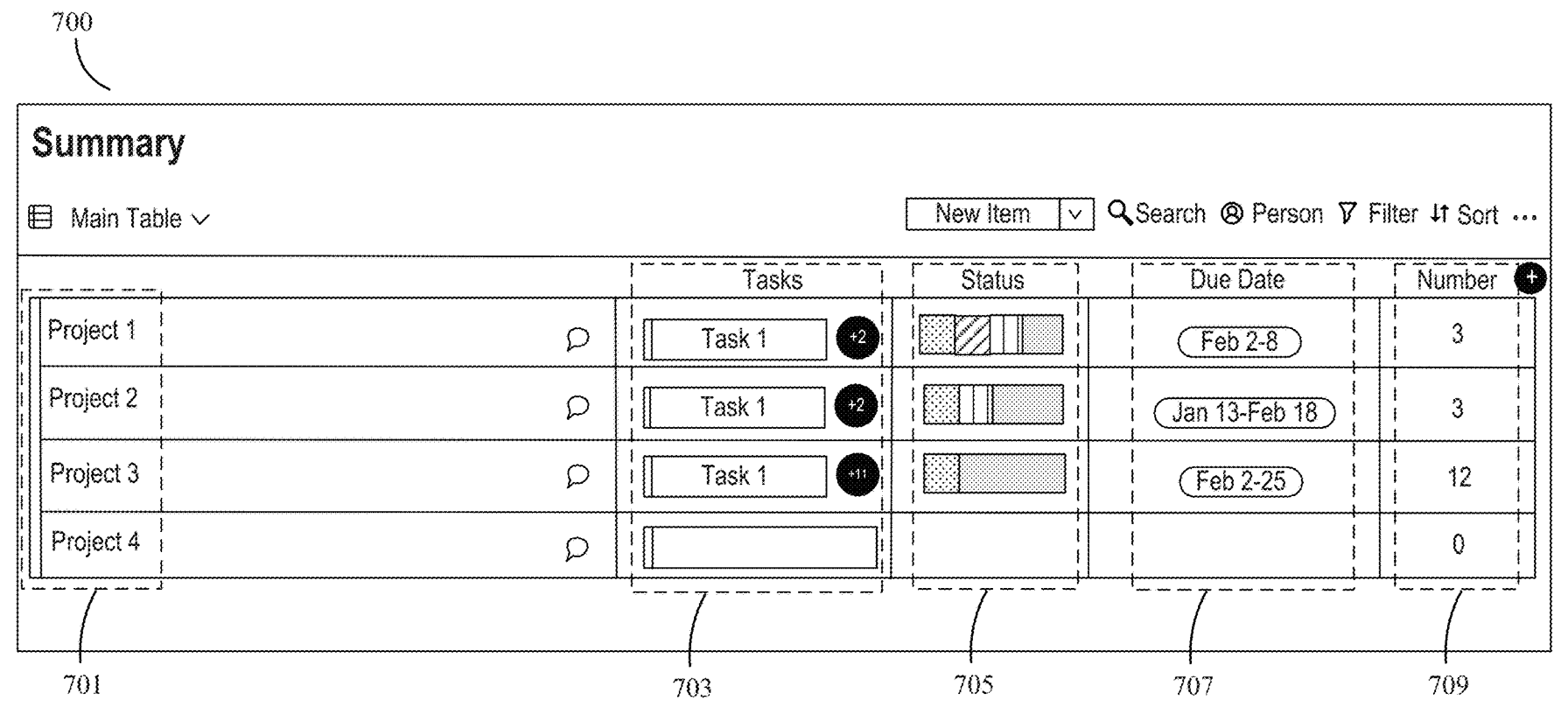

For example, FIG. 7 illustrates an exemplary third board 700 reflecting a similarity consolidation, consistent with embodiments of the present disclosure. In FIG. 7, third board 700 may include a table having multiple horizontal rows, such as rows 701 representing lower level boards associated with "Project 1," "Project 2," "Project 3," and "Project 4." Each row in third board 700 may include information consolidated from the lower level boards, as reflected in "Tasks" column 703 representing the consolidated tasks, "Status" column 705 representing the status of the consolidated tasks, "Due Date" column 707 representing the deadlines of the consolidated tasks, and "Number" column 707 representing the total number of consolidated tasks. The data consolidated as row "Project 1" in FIG. 7 may be extracted from first board 500 described above in connection with FIG. 5. Similarly, the data consolidated as row "Project 2" in FIG. 7 may be extracted from second board 600 described above in connection with FIG. 6. The information on third board 700 may represent information from lower level boards having a similarity, in this case information associated with "Status" and "Due Date" information from the first board and the second board. Conversely, third board 700 may omit information not present in both the first board and the second board. For example, because first board 500 in FIG. 5 contains "Person" column 505 representing individuals associated with a task, but second board 600 in FIG. 6 does not, third board 700 in FIG. 7 may omit this information. In addition, as can be appreciated from FIG. 7, third board 700 may include information associated with other boards, such as boards associated with "Project 3" and "Project 4." Consequently, third board 700 may include other information associated with the first board and the second board, or may include any other information not related to the first board and the second board.

In some embodiments, identifying the shared similarity may include discovering a first plurality of common row headings in the first data, discovering a second plurality of common row headings in the second data, and wherein consolidating the identified similarity may include generating a singular entry in the third board consolidating the first plurality of common row headings and second plurality of common row headings. Discovering a plurality of common row headings may involve performing semantic analysis to determine whether a group of row headings in the first data share a commonalities with a group of row headings in second data as discussed above (although other suitable steps or methods may be performed to determine whether there is a commonality). For example, in embodiment where the first board and the second board include workflow management information, all tasks associated with a project in the first data and the second data may be consolidated. Subsequently, a singular entry, such as a cell, in the third board may be used to consolidate the tasks associated with the project in the first data and the second data. For example, the third board may have a row labeled "Project 1" having a cell with a total number of tasks in the first data and the second data associated with that project (e.g., "40" representing forty tasks), and the third board may also have a row labeled "Project 2" having a cell with a total number of tasks in the first data and the second data associated with that project (e.g., "30" representing thirty tasks), and so forth. Other ways of consolidating the information on the third board may be used, as discussed herein.

The at least one processor may be configured to summarize the first portion and the second portion, consistent with disclosed embodiments. Summarizing a portion may include representing it in a same or a condensed manner as compared to how it is presented in the first board and/or the second board, such as through one or more instructions, signals, logic tables, logical rules, logical combination rules, logical templates, a combination thereof, or any other operation for indicating information in a same or condensed manner as compared to its original source. In embodiments where the first board and the second board include tablature, summarizing the first portion may involve adding, editing, deleting, or otherwise modifying a variable or other information representing two or more cells in the first portion. In some embodiments, for example, summarizing the first portion and the second portion may include counting common statuses within the first portion and the second portion. For example, the at least one processor may be configured to tally a total number of cells in the first portion and the second portion associated with a "Done" status, or it may modify a variable in a data structure, database, or similar structure by the total number, or it may increase a height of a "Done" bar in a bar graph by the total number, or through any other suitable process of adding information. As a further example, the status of one-hundred tasks associated with a project may be tallied in the form of a percentage, such as representing forty "Done" tasks out of the one-hundred tasks as 40%. Other information other than status information may be summarized, such as name, project, country, person, team, progress, or any other feature or characteristic associated with the first portion and the second portion. Summarizing may be performed automatically, manually, or a combination thereof, such as a result of a mouse click, a cursor hover, a mouseover, a button press, a keyboard input, a voice command, an interaction performed in virtual or augmented reality, or any other action by a user received via the at least one processor. For example, summarizing the first portion may be performed as a result of a user interacting with a button. Additionally or alternatively, the at least one processor may automatically summarize the first portion as result of a default setting or a user preference.

The at least one processor may be configured to aggregate the summarized first portion and the summarized second portion to form an aggregated summary, consistent with disclosed embodiments. Aggregating information to form an aggregated summary may include presenting the information in a same or a condensed manner as compared to how it is presented in the first board and the second board, such as through one or more graphical representations, dashboards, widgets, tables or tabulations, flowcharts, maps, bar charts, circle charts, pie charts, alphanumeric characters, symbols, pictures, a combination thereof, or any other content of information. Generating an aggregated summary may be performed automatically, manually, or a combination thereof, such as a result of a mouse click, a cursor hover, a mouseover, a button press, a keyboard input, a voice command, an interaction performed in virtual or augmented reality, or any other action by a user received via the at least one processor, as described above.

Figure 8A:
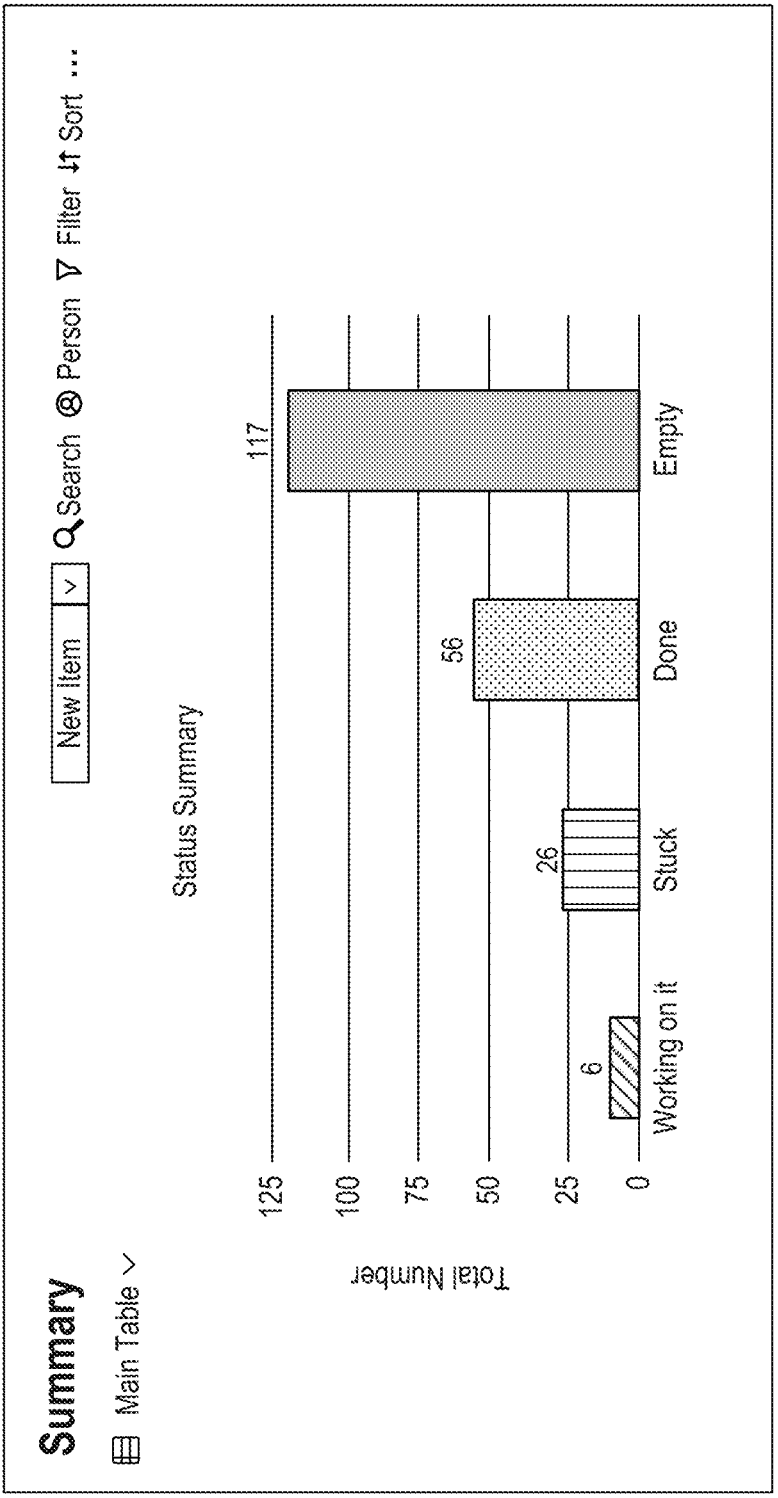
FIGS. 8A and 8B illustrate exemplary aggregated summaries, consistent with some embodiments of the present disclosure.
Figure 8B:
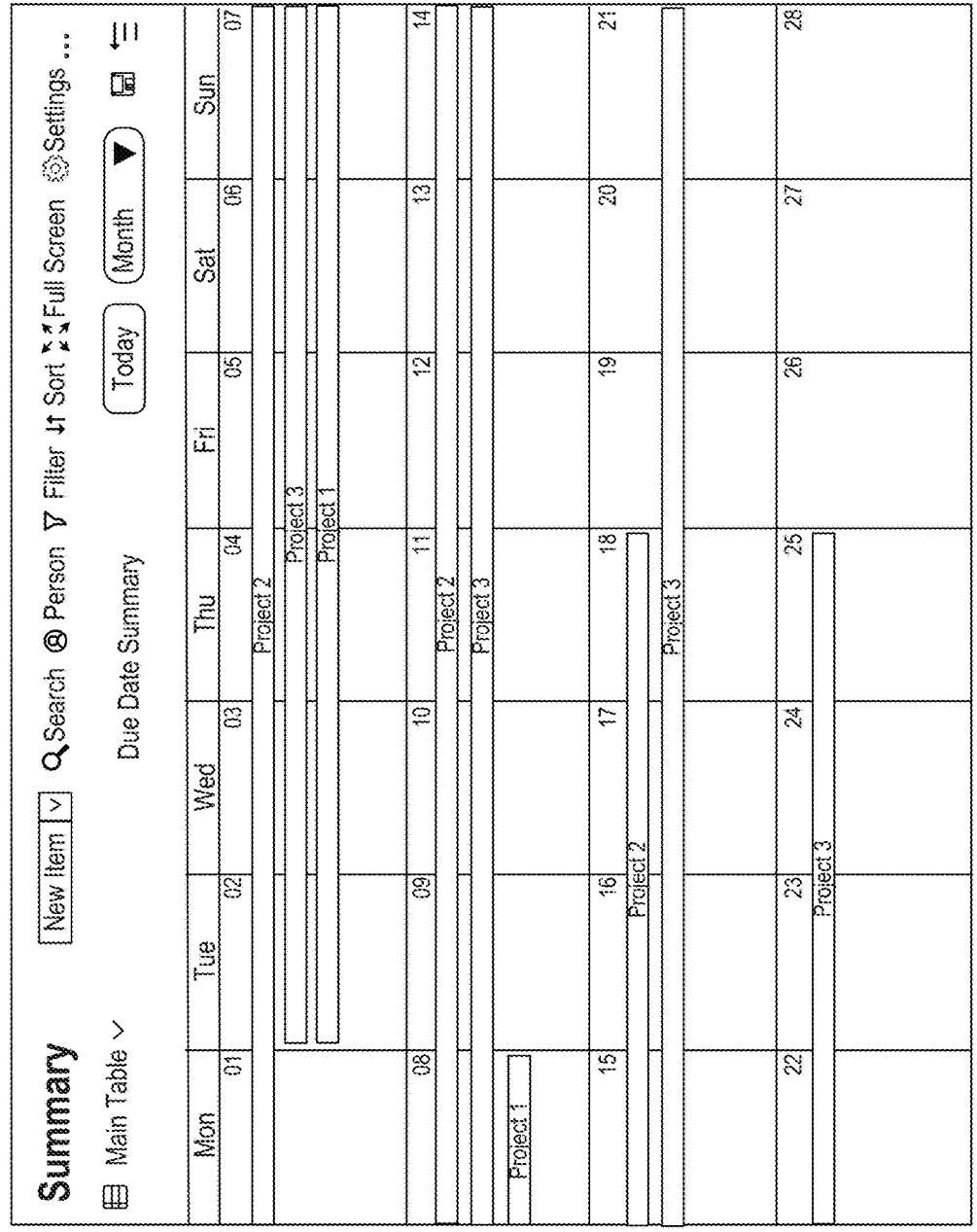

For example, FIGS. 8A and 8B illustrate exemplary aggregated summaries 800a and 800b, respectively, consistent with disclosed embodiments. In FIGS. 8A and 8B, aggregated summaries 800a and 800b may be part of or independent from third board 700 described above in connection with FIG. 7. As shown in FIG. 8A, aggregated summary 800a may include a similarity between the first board, the second board, and any other boards (if any), which in the example of FIG. 8A may include "Status" information. For example, aggregated summary 800a may depict a number of entries having a status of "Working on it," "Stuck," "Done," or none (e.g., "Empty"), as shown in FIG. 8A. Similarly, aggregated summary 800b may include a similarity between one or more boards, which in the example of FIG. 8B may include "Due Date" information. For example, aggregated summary 800b may depict a calendar corresponding to entries having a due date associated with "Project 1," "Project 2," and "Project 3." Other types of aggregated summaries may be generated, as discussed above.

The at least one processor may be configured to present on the third board the aggregated summary in a manner associating the aggregated summary with the similarity consolidation, consistent with disclosed embodiments. The aggregated summary on the third board may be presented through one or more mobile devices, desktops, laptops, tablets, LED display, augmented reality (AR), virtual reality (VR) display, a combination thereof, or through any other suitable device or method of depicting graphical information. Presenting the aggregated summary may include displaying the summarized first portion and the summarized second portion in a same or a condensed manner, as discussed above. In addition, presenting the aggregated summary may include displaying a similarity between the first portion and the second portion sharing the similarity, such as by including a data type, data value, structure information, or any other information used by the system to determine the similarity between the first portion and the second portion. In some embodiments, for example, the manner associating the aggregated summary with the similarity consolidation may include displaying the similarity consolidation as a row heading and the aggregated summary in a cell associated with the row heading. In such embodiments, the row heading may be represented as one or more alphanumeric characters, symbols, pictures, avatars, videos, VR or AR objects, graphs, metadata, a combination thereof, or any other suitable depiction of the similarity consolidation included in the row.

For example, in FIG. 7, third board 700 may include row headings having cells associated with a similarity consolidation, consistent with disclosed embodiments. As an illustration only, third board 700 may include a "Project 1" row heading associated with first board 500 in FIG. 5 and a "Project 2" row heading associated with second board 600 in FIG. 6. As shown in FIG. 7, third board 700 may also include row headings "Project 3" and "Project 4" associated with other boards. Each row in third board 700 may include one or more cells associated with a corresponding board, and which may represent at least a part of the similarity consolidation. For example, a cell in the "Project 1" row in "Tasks" column 703 may represent consolidated tasks in the first board; a cell in "Status" column 705 may represent consolidated status information of the tasks in the first board; a cell in "Due Date" column 707 may represent consolidated deadlines of the tasks in the first board; and a cell in "Number" column 709 may represent a total number of consolidated tasks in the first board. The same information may be displayed for other boards as represented by other row headings, such as "Project 2," "Project 3," and "Project 4" row headings, as shown in FIG. 7.

The aggregated summary may be presented as a cell associated with the row heading. A cell may refer to a unit of information contained in the third board defined by the structure of the third board, such as an intersection between a horizontal row with a vertical column, intersection between a vertical row with a horizontal column, a node on a tree data structure, a node on a web chart, or any other structural unit, as defined above. The information in the cell may be represented using the same, similar, or a different form as compared the row heading, such as through one or more alphanumeric characters, symbols, pictures, avatars, videos, VR or AR objects, graphs, summary information, metadata, a combination thereof, or any other suitable depiction. In some embodiments, for example, the cell may include a numeral or a summary representation. As an illustration, the cell in the third board may include a number, such as "3" representing three tasks having a similarity; text, such as "Stuck (3)" representing three tasks having a stuck status; color representation, such as three green boxes representing three "Done" tasks; an image, such as a client's company logo representing tasks associated with that client; or any other depiction of the number of cells in the first board and the second board sharing the similarity.

For example, in FIG. 7, third board 700 may include a column indicating a total number of data in in the first board and the second board sharing a similarity, consistent with disclosed embodiments. As an illustration only, third board 700 may include a "Number" column 709 indicating a total number of tasks in each board sharing a similarity. Because three tasks from each of first board 500 in FIG. 5 and second board 600 in FIG. 6 share a similarity, in this case "Status" and "Due Date" information, the "Project 1" and "Project 2" rows both have a "3" in "Number" column 709. Another board associated with "Project 3" may have more tasks sharing a similarity with the first board and the second board, in this case twelve tasks indicated as a "12" in "Number" column 709. Yet another board associated with "Project 4" may have less tasks sharing a similarity with the first board and the second board, in this case zero tasks indicated as a "0" in "Number" column 709. Other ways of indicating a total number of data sharing a similarity may be used, as described above.

In some embodiments, the cell may include an active link, and at least one processor may be configured, upon activation of the link, to cause a display of at least one of the portion of the first data or the portion of the second data. An active link may refer to any connection, linkage, relationship, instruction, signal, logic table, logical rule, logical combination rule, logical template, or any suitable element or operation for accessing, referring, displaying, or otherwise making available the portion of the first data and/or the portion of the second data. The activation may be performed automatically, manually, or a combination thereof, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a number or a status in a cell on the third board, the at least one processor may be configured to display a fourth board including the underlying first data and the second data from which the cell on the third board was generated. In some embodiments, a user or the at least one processor may edit the portion of the first data and/or the portion of the second data directly from the display. For example, a user may modify one or more status cells in the first board by first interacting with a status summary cell in the third board, and subsequently editing the corresponding cells that are displayed as a result of the interaction.

Figures 9, 10:
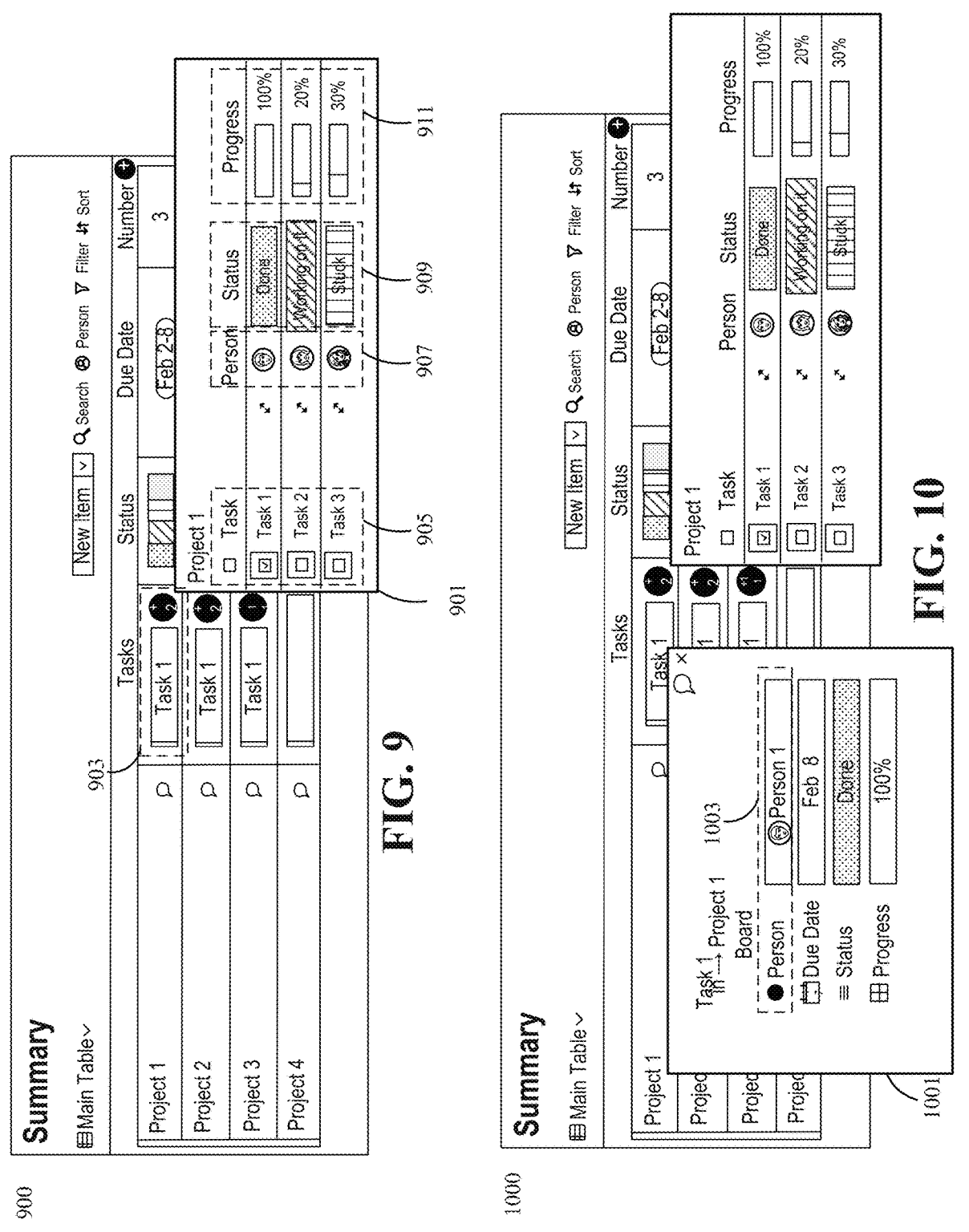

For example, FIG. 9 illustrates an exemplary display 901 generated as a result of an activation of a link in a cell, consistent with disclosed embodiments. Display 901 may be overlaid on top of board 900, which may be third board 700 discussed above in connection with FIG. 7. In FIG. 9, cell 903 ("Task 1" in "Project 1") may include an active link to generate display 901, although any other cells in board 900 may have active links. Consequently, display 901 may be generated as a result of a user interaction, such as a mouse click, with cell 903. Display 901 may include information associated with tasks in the first board, although in some embodiments it may display information associated with tasks in the second board, both, or any other board(s). Display 901 may, for example, include a "Task" column 905 representing tasks in the first board, a "Person" column 907 representing individuals associated with each task in the first board, a "Status" column 909 representing status information associated with each task in the first board, and a "Progress" column 911 representing completion information associated with each task in the first board. Other information associated with the first board may be displayed, however. In addition, a user may edit information present on display 901.

For example, FIG. 10 illustrates another exemplary display 1001 for editing information on a third board, consistent with disclosed embodiments. Display 1001 may be overlaid on top of board 1000, which may be third board 700 discussed above in FIG. 7. In FIG. 10, display 1001 may be generated as a result of a user interaction with a cell having an activation link in board 1000, similar to display 901 discussed above in connection with FIG. 9. However, display 1001 in FIG. 10 may be generated as a result of another user interaction, such as by an interaction with display 901 in FIG. 9 (e.g., "Task 1"), or through any other instruction, operation, function, or any other information received by the at least one processor. Display 1001 in FIG. 10 may include one or more interactive elements that a user may utilize to edit information on the first board, the second board, or any other board, directly. For example, a user may interact with "Person 1" cell 1003 to edit information about individuals associated with "Task 1" in the first board. A user may do the same with the "Due Date," "Status," or "Progress" information in display 1001. In this way, a user may edit information in the underlying first board and second board directly from the third board or any other aggregated summary, thereby saving time.

In some embodiments, the aggregated summary may include an indication of a number of entries that share a common status. For example, three cells associated with a "Done" status may be summarized a single cell with the number "3," or may be summarized as a bar in a bar graph that is three units in height, or as three green blocks, or through any other suitable representation. As a further example, the status of one-hundred tasks associated with a project may be summarized as a "Project Progress" cell, where each task with a "Done" status may increase the progress by one percent (e.g., forty "Done" tasks would result in a "Project Progress" of 40%). Other information other than status information may be summarized, such as name, project, country, person, team, progress, or any other feature or characteristic associated with the first portion and the second portion.

For example, in FIG. 8A, aggregated summaries 800a may include an indication of a number of entries that share a common status, consistent with disclosed embodiments. As shown in FIG. 8A, aggregated summary 800a may depict a number of entries having a status of "Working on it," "Stuck," "Done," or none (e.g., "Empty"). Each type of status may include a number of entries that share that status. For example, aggregated summary 800a may include a "6" above the status "Working on it," indicating that six tasks in the aggregated boards are in progress; a "26" above the status "Stuck," indicating that twenty-six tasks in the aggregated boards cannot progress further; a "56" above the status "Done," indicating that fifty-six tasks in the aggregated boards are complete; and a "117" above the status "Empty," indicating that one-hundred and seventeen tasks in the aggregated boards do not have a status associated with them.

Figure 11:
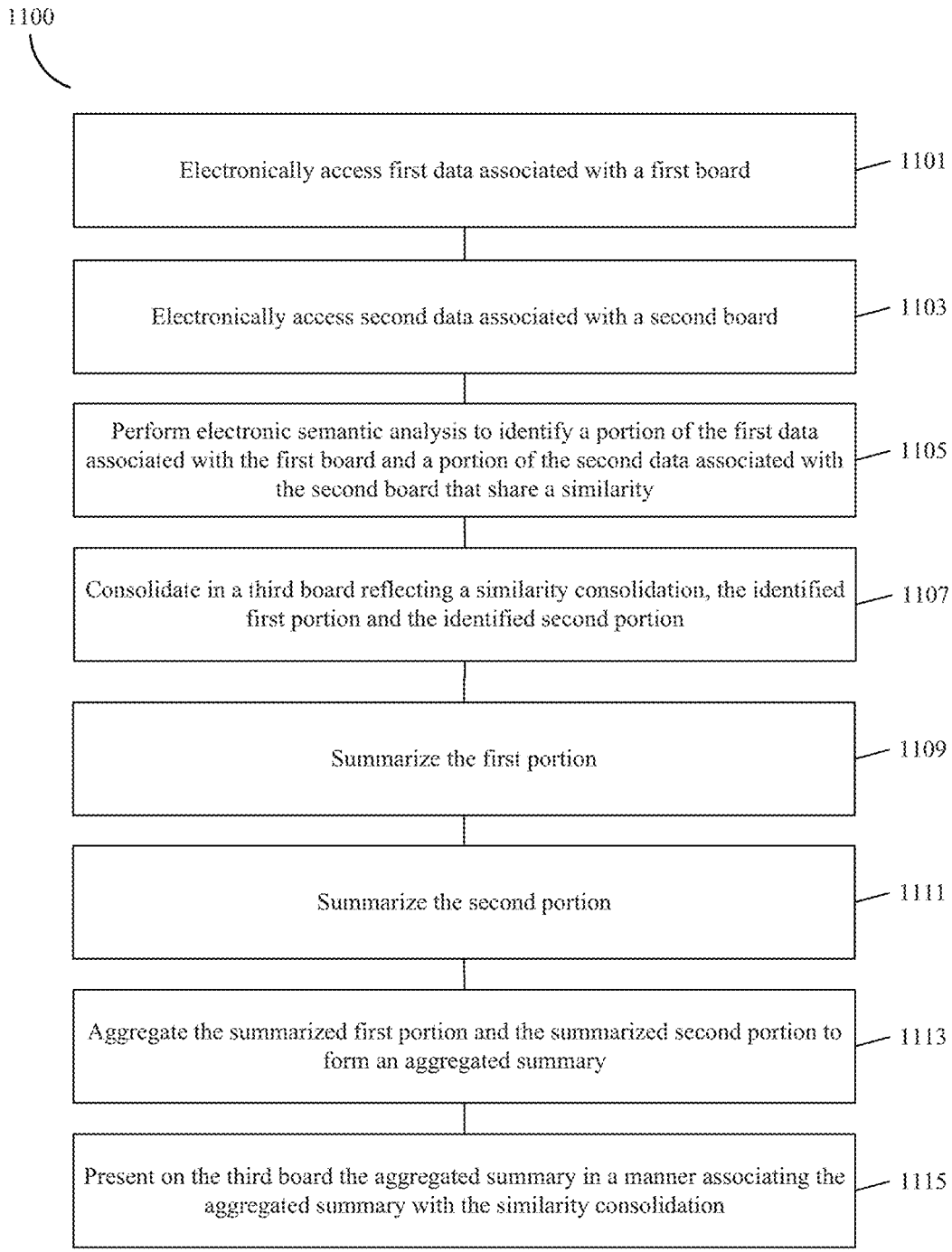
FIG. 11 is a block diagram of an example process for generating high level summary tablature based on lower level tablature, consistent with some embodiments of the present disclosure.

FIG. 11 illustrates a block diagram of an example process 1100 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 11. In some embodiments, the process 1100 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 3 to 10, by way of example. In some embodiments, some aspects of the process 1100 may be implemented as software (e.g., program codes or instructions) that are stored in a memory (e.g., the memory portion 122 in FIG. 1) or a non-transitory computer-readable medium. In some embodiments, some aspects of the process 1100 may be implemented as hardware (e.g., a specific-purpose circuit). In some embodiments, the process 1100 may be implemented as a combination of software and hardware.

FIG. 11 includes process blocks 1101 to 1115. At block 1101, a processing means (e.g., the processing circuitry 110 in FIG. 1) may electronically access first data associated with a first board (e.g., first board 500 in FIG. 5). At block 1103, the processing means may electronically access second data associated with a second board (e.g., second board 600 in FIG. 6). In some embodiments, the first data and the second data may include row headings (e.g., row headings 501 and 601 in FIGS. 5 and 6, respectively). In some embodiments, the first data and the second data may include status information (e.g., status information 507 and 607 in FIGS. 5 and 6, respectively).

At block 1105, the processing means may perform electronic semantic analysis to identify a portion of the first data associated with the first board and a portion of the second data associated with the second board that share a similarity. In some embodiments, the identified similarity between the first data and the second data may include common status information. In some embodiments, the shared similarity may include a similarity between row headings.

At block 1107, the processing means may consolidate in a third board reflecting a similarity consolidation, the identified first portion and the identified second portion (e.g., third board 700 in FIG. 7). In some embodiments, identifying the shared similarity may include discovering a first plurality of common row headings in the first data, discovering a second plurality of common row headings in the second data, and wherein consolidating the identified similarity may include generating a singular entry in the third board consolidating the first plurality of common row headings and second plurality of common row headings.

At block 1109, the processing means may summarize the first portion. At block 1111, the processing means may summarize the second portion. In some embodiments, summarizing the first portion and the second portion may include counting common statuses within the first portion and the second portion.

At block 1113, the processing means may aggregate the summarized first portion and the summarized second portion to form an aggregated summary (e.g., aggregated summaries 800a and 800b in FIGS. 8A and 8B, respectively).

At block 1115, the processing means may present on the third board the aggregated summary in a manner associating the aggregated summary with the similarity consolidation. The manner associating the aggregated summary with the similarity consolidation may include displaying the similarity consolidation as a row heading and the aggregated summary in a cell associated with the row heading. The cell may include a numeral or a summary representation and may also include an active link, and wherein the at least one processor may be configured, upon activation of the link, to cause a display of at least one of the portion of the first data or the portion of the second data (e.g., displays 901 and 1001 in FIGS. 9 and 10, respectively). In some embodiments, the aggregated summary may include an indication of a number of entries that share a common status.

Consistent with disclosed embodiments, systems, methods, and computer readable media for generating high level summary tablature based on lower level tablature are disclosed. The systems and methods described herein may be implemented with the aid of at least one processor or non-transitory computer readable medium, such as a CPU, FPGA, ASIC, or any other processing structure(s) or storage medium, as described herein.

Using computerized systems and methods for generating high level summary tablature using selections provides several advantages over extant processes that rely on cumbersome and unintuitive aggregating processes. For example, users may find it desirable to aggregate specific information on lower level tablature based on a desired use or preference. In such cases, one or more types of information of interest in two or more boards may be selected manually, automatically, or semi-automatically. Subsequently, the computerized systems and methods disclosed herein may receive the selection as input, may identify and aggregate items of interest having a similarity, and may present them in a convenient and consolidated manner. The disclosed computerized systems and methods may process and analyze any information in the lower level tablature to make this determination, including data types, data content, board data, and any other information associated with the lower level tablature. Extant systems and methods may fail to utilize selections in generating summarized information, which may fail to provide the flexibility desired by users. Further, extant systems and methods may fail to identify items having a similarity in the selected information in a computerized manner that affords convenience to the user.

Some disclosed embodiments may be configured to electronically receive a first selection of at least one item contained on both a first board and a second board. A board may include a table with items (e.g., individual items presented in horizontal rows) defining objects or entities that are managed in the platform (such as tasks, projects, clients, deals, or other information), as discussed herein. A board may include two or more different boards or tables, or may directly or indirectly access data from one or more other boards, tables, or other sources. A selection may include any automatic, semi-automatic, or manual signal, instruction, process, logical rule, logical combination rule, template, setting, a combination thereof, or any other operation for choosing information in a board. As non-limiting examples, a selection may include a mouse click, a cursor hover, a mouseover, a button press, a keyboard input, a voice command, an interaction performed in virtual or augmented reality, a default based on a user or system setting, a combination thereof, or any other signal received via the at least one processor. A selection of data presented on the first board and/or the second board may be received through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provides a medium for exchanging data.

Figures 12, 13:
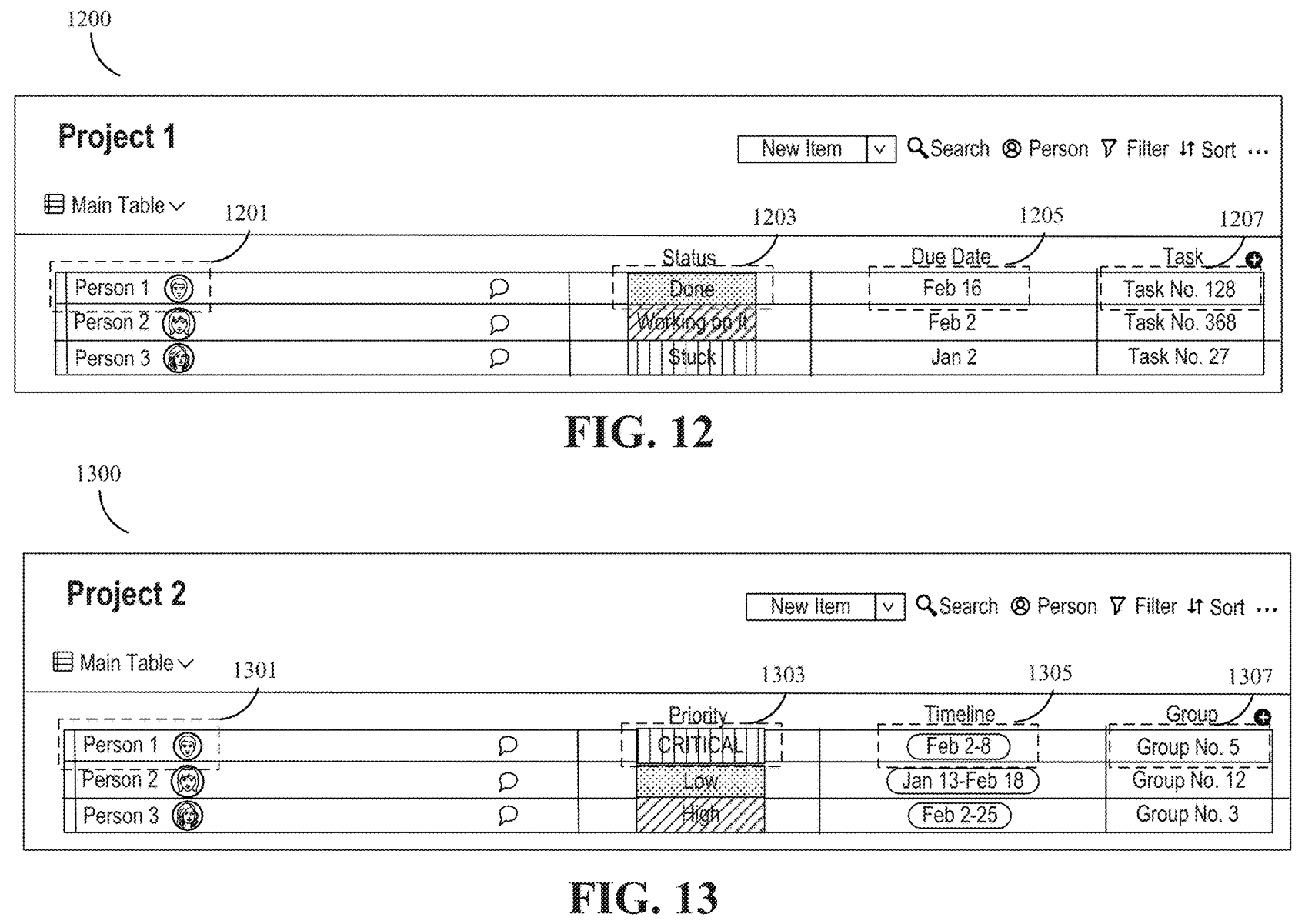

For example, FIG. 12, illustrates an exemplary first board 1200 the data of which may be selected, consistent with embodiments of the present disclosure. As shown in FIG. 12, first board 1200 may include a table including multiple horizontal rows, such as rows representing "Person 1," "Person 2," and "Person 3." Each row in first board 1200 may include task information associated with an individual (e.g., "Person 1" 1201) in a particular project (e.g., "Project 1"), such as status information indicated by "Done" cell 1203, deadline information indicated by "Feb 16" cell 1205, and task identification information indicated by "Task No. 128" cell 1207. First board 1200 may include other information associated with a task, or any other kind of information not related to tasks or workflow management information.

FIG. 13, illustrates an exemplary second board 1300 the data of which may be selected, consistent with embodiments of the present disclosure. In FIG. 13, second board 1300 may include a table including multiple horizontal rows, such as rows representing "Person 1," "Person 2," and "Person 3." Each row in second board 1300 may include task information associated with an individual (e.g., "Person 1" 1301) in a particular project (e.g., "Project 2"), such as priority information indicated by "CRITICAL" cell 1303, timeline information indicated by "Feb 2-8" cell 1305, and project group information indicated by "Group No. 5" cell 1307. Second board 1300 may include other information associated with a task, or any other kind of information not related to tasks or workflow management information.

As can be appreciated from comparing FIG. 12 with FIG. 13, first board 1200 and second board 1300 may include the same, similar, or different information. In FIGS. 12 and 13, for example, both boards may contain information on "Person 1," labeled as item 1201 in FIG. 12 and item 1301 in FIG. 13. In some embodiments, the at least one processor may be configured to electronically receive a selection of this item, or any other item contained on both the first board and the second board, as described above. In addition, both boards may include information on a current state of an individual's work with respect to a project, such as status information (e.g., "Done" cell 1203 in FIG. 12) and priority information (e.g., "CRITICAL" cell 1303 in FIG. 13). Both boards may also include information on one or more significant dates associated with the individual's work, such as due date information (e.g., "Feb 16" cell 1205 in FIG. 12) and timeline information (e.g., "Feb 2-8" cell 1305 in FIG. 13). However, as illustrated, the first board and the second board may include different information. For example, first board 1200 in FIG. 12 may include information on individual tasks (e.g., "Task No. 128" cell 1207), while second board 1300 in FIG. 13 may include information on project groups instead (e.g., "Group No. 5" cell 1307).

Disclosed embodiments may be further configured to electronically receive a second selection of a first type of information presented on the first board. A second selection may be received in the same or similar manner as the first selection, as discussed herein. A type of information may represent any characteristic, feature, attribute, or any aspect related to data on a board. For example, in embodiments when the first board and the second board include workflow management information, a type of information may be associated with one or more status values, projects, countries, persons, teams, progresses, a combination thereof, or any other information related to a task. It is to be understood, however, that the disclosed embodiments are not limited to any particular type of information, but may rather be used in conjunction with any suitable type of information depending on the information contained in a board or depending on any other context.

For example, in FIG. 12, a second selection of "Done" cell 1203 in first board 1200 may be electronically received by the processor, consistent with disclosed embodiments. The detection may be automatic (e.g., periodic), a result of a user interaction (e.g., a mouse click), or a combination of both, as discussed herein. In such embodiments, the first type of information associated with the second selection may be status information, since "Done" cell 1203 may be indicative of a state of a task in a cell, although any other type of information may be used depending on other information contained in first board 1200 or any other context.

In some embodiments, the first type of information may be associated with a first heading. In such embodiments, the first board and the second board may include one or more tablature having one or more headings defining or indicating a category or attribute associated with the information in that row. A heading may be depicted as text, numbers, symbols, images, avatars, videos, AR or VR objects, or any other graphical representation. A heading may be associated with one or more horizontal presentations, vertical presentations, or both, as discussed herein. For example, in embodiment where the first board and the second board include columns and rows, the columns and rows may have headings associated with their content, such as a task, name, status, project, country, person, team, progress, or any other feature or characteristic that may be associated with the information associated with a particular column or row.

For example, in FIGS. 12 and 13, first board 1200 and second board 1300 may include one or more headings. As illustrated in FIGS. 12 and 13, a heading may be associated with an individual in a horizontal row, such as "Person 1," "Person 2," and "Person 3." A heading may also be associated with a vertical column, such as the "Status," "Due Date," and "Task" headings shown in FIG. 12, or the "Priority," "Timeline," and "Group" headings shown in FIG. 13. Following the example above, the first type of information associated with the second selection of "Done" cell 1203 may be status information, which is associated with the "Status" column heading in first board 1200.

Disclosed embodiments may be further configured to electronically receive a third selection of a second type of information presented on the first board. A third selection may be received in the same or similar manner as the first and/or second selections, as discussed herein. In some embodiments, the second type of information may be associated with a second heading. The second type of information may be the same, similar, or different from the first type of information discussed herein. Likewise, the second heading may be the same, similar, or different from the first heading discussed herein.

For example, in FIG. 12, a third selection of "Feb 16" cell 1205 in first board 1200 may be electronically received by the processor, consistent with disclosed embodiments. In such embodiments, the second type of information associated with the third selection may be deadline information, since "Feb 16" cell 1205 is indicative of a significant date of a task, although any other type of information may be used depending on other information in first board 1200 or any other context. In this case, the second type of information associated with the third selection of "Feb 16" cell 1205 may be due date information, which is associated with the "Due Date" column heading in first board 1200.

Some disclosed embodiments may be configured to electronically receive a fourth selection of a third type of information presented on the second board. A fourth selection may be received in the same or similar manner as the first, second, and/or third selections, as discussed herein. In some embodiments, the third type of information may be associated with a third heading. The third type of information may be the same, similar, or different from the first and/or second type of information discussed herein. Likewise, the third heading may be the same, similar, or different from the first and/or second heading discussed herein.

For example, in FIG. 12, a fourth selection of "CRITICAL" cell 1303 in second board 1300 may be electronically received by the processor, consistent with disclosed embodiments. In such embodiments, the third type of information associated with the fourth selection may be priority information, since "CRITICAL" cell 1305 is indicative of an urgency status of a task, although any other type of information may be used depending on other information in second board 1300 or any other context. In this case, the third type of information associated with the fourth selection of "CRITICAL" cell 1305 may be priority information, which is associated with the "Priority" column heading in second board 1300.

In some embodiments, the first type of information may be aggregable with the third type of information in a first aggregation, wherein the first heading may differ from the third heading. The first type of information and the third type of information may be aggregable based on a shared nature or relationship indicating a commonality between the two or more types of information, such as one or more common data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system.

For example, in FIGS. 12 and 13, a first type of information associated with "Done" cell 1203 in FIG. 12 may be aggregable with a third type of information associated with "CRITICAL" cell 1303 in FIG. 13, consistent with disclosed embodiments. In this non-limiting example, because the type of information of "Done" cell 1203 in FIG. 12 is status information, and the type of information of "CRITICAL" cell 1303 in FIG. 13 is priority information, these two types of information may be aggregable despite having differing headings since they both relate to a state of a task associated with an individual.

Some disclosed embodiments may be further configured to determine a similarity between the first type of information and the third type of information. A similarity may be determined by identifying relationships between the first type of information and the third type of information, such as by analyzing data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system. Such analysis, as described herein and as applicable to other similar instances of analysis, may be performed by artificial intelligence or any other process or mechanism for similarity determination. In some instances, for example, a relational data structure may associate differing words in order to aid in similarity determination.

In some embodiments, the similarity may be based on a position. A position may relate to any relational placement with respect to surrounding information, such as placement in a column, row, board, widget, graph, graphical representation, or any other structural data arrangement. In embodiments where the similarity may be based on a position, the system may determine that two types of information share a similarity as a result of having the same or similar position in the structural data arrangement. As a non-limiting example, in embodiments where the first board and the second board include tablature having rows and columns, the system may determine that the first type of information and the third type of information share a similarity if they are located in the same column in the first board and the second board, respectively. Other positional and structural information may be used, as would be understood by a person having ordinary skill in the art.

For example, in FIGS. 12 and 13, the system may determine that the type of information associated with "Done" cell 1203 in FIG. 12 may share a similarity with the type of information associated with "CRITICAL" cell 1303 in FIG. 13 based on position. In this non-limiting example, because the column containing "Done" cell 1203 in FIG. 12 is the second left-most column in board 1200, and the column containing "CRITICAL" cell 1303 in FIG. 13 is also the second left-most column in board 1300, the system may determine that these two columns share a similarity based on position.

In some embodiments, the similarity may be based on a data type. Data types may include text, numbers, calendar information, formulas, time, files, multi-select data, tags, check boxes, a combination thereof, or any other attribute or characteristic of information. In embodiments where the similarity may be based on a data type, the system may determine that two types of information share a similarity as a result of having the same or similar data types. For example, the first type of information may include one or more cells with a range of dates associated with a timeline, such as "December 8-February 12," and the third type of information may also include one or more cells with a range of dates associated with a timeline, such as "December 8-February 18." In such cases, the system may determine that the two types of information share a similarity because both have the same type of data, in this case calendar information. The system may arrive at the same result if the two types of information are similar, such as numbers compared to formulas, numerical strings compared to numbers, persons compared to groups, emails compared to names, and any other data types that relate to one another. Conversely, the first type of information may include one or more cells including status information, such as "Done," and the third type of information may include one or more cells including telephone numbers associated with a person, such as "+123 45 678 9123." In such cases, the system may determine that the two types of information do not share a similarity because they do not share the same data type, in this case text and numbers (although in some embodiments there may be sufficient relationship between the two to constitute a similarity). Other data types and combinations may be used, as would be understood by a person having ordinary skill in the art.

For example, in FIGS. 12 and 13, the system may determine that the type of information associated with "Feb 16" cell 1205 in FIG. 12 may share a similarity with the type of information associated with "Feb 2-8" cell 1305 in FIG. 13 based on data types. In this non-limiting example, because "Feb 16" cell 1205 in FIG. 12 contains calendar data, and "Feb 2-8" cell 1305 in FIG. 13 also contains calendar data, the system may determine that these two types of information share a similarity based on data type.

In some embodiments, the similarity may be based on a historical usage. Historical data may include any information previously utilized or generated by the system, such as one or more previous signals, instructions, operations, functions, database retrievals, inputs received from one or more users, user preferences, default settings, interactions with a board or tablature, graphical representations, or any other information associated with the system. In embodiments where the similarity may be based on a historical usage, the system may determine that two types of information share a similarity as a result of having previously been subject to the same or similar historical usage. For example, if the system previously aggregated the first type of information and the third type of information, such as in the form of a summary, graphical representation (e.g., charts), or any other aggregation, the system may determine that the two types of information share a similarity as a result of this historical information. In other embodiments, the system may determine that two types of information share a similarity because a user previously aggregated them, such as by combining the two types of data, generating graphical representations (e.g., charts) of them, or selecting them to be similar as a user preference. Other historical usages may be used, as would be understood by a person having ordinary skill in the art.

In some embodiments, the similarity may be based on a logical rule. A logical rule may be any function for causing the system to perform an action on information contained in a board, such as one or more notification generation rules, sound generation rules, data generation rules, data aggregation rules, column rules, row rules, default rules, logical templates, settings, operations, instructions, signals, or any other electronic prompt for causing the system to perform an action. In embodiments where the similarity may be based on a logical rule, the system may determine that two types of information share a similarity as a result of being subject to the same or similar logical rule. As a non-limiting example, in embodiments where the system generates one or more notifications (e.g., email messages) to a particular user as a result of a change in two types of information, the system may determine that the two types of information share a similarity as a result of being subject to the same notification generation rule. Other logical rules may be utilized depending on the information contained in the first board and the second board, and any inputs received by the system, as would be understood by those having ordinary skill in the art.

As an illustration, in FIGS. 12 and 13, the system may determine that the type of information associated with "Done" cell 1203 in FIG. 12 may share a similarity with the type of information associated with "CRITICAL" cell 1303 in FIG. 13 based on a logical rule. If the system is configured to generate an email notification to "Person 1" as a result of a change in status information (e.g., "Stuck") and a change in priority information (e.g., "CRITICAL"), the system may determine that these two types of information share a similarity.

Some disclosed embodiments may involve electronically receiving a fifth selection of a fourth type of information presented on the second board. A fifth selection may be received in the same or similar manner as the first, second, third, and/or fourth selections, as discussed above. In some embodiments, the fourth type of information may be associated with a fourth heading. The fourth type of information may be the same, similar, or different from the first, second, and/or third type of information discussed above. Likewise, the fourth heading may be the same, similar, or different from the first, second, and/or third heading discussed above.

For example, in FIG. 12, a fifth selection of "Feb 2-8" cell 1305 in second board 1300 may be electronically received by the processor, consistent with disclosed embodiments. In such embodiments, the fourth type of information associated with the fourth selection may be timeline information, since "Feb 2-8" cell 1305 is indicative of a range of significant dates of a task, although any other type of information may be used depending on other information in second board 1300 or any other context. In this case, the fourth type of information associated with the fifth selection of "Feb 2-8" cell 1305 may be timeline information, which is associated with the "Timeline" column heading in second board 1300.

In some embodiments, the second type of information may be aggregable with the fourth type of information in a second aggregation, wherein the second type of information may be aggregable with the fourth type of information in a second aggregation. The second type of information and the fourth type of information may be aggregable based on a shared nature or relationship indicating a commonality between the second and fourth types of information, as discussed above.

For example, in FIGS. 12 and 13, a second type of information associated with "Feb 16" cell 1205 in FIG. 12 may be aggregable with a fourth type of information associated with "Feb 2-8" cell 1305 in FIG. 13, consistent with disclosed embodiments. In this non-limiting example, because the type of information of "Feb 16" cell 1205 in FIG. 12 is due date information, and the type of information of "Feb 2-8" cell 1305 in FIG. 13 is timeline information, these two types of information may be aggregable despite having differing headings since they both relate to calendar information of a task associated with an individual.

Some disclosed embodiments may further involve electronically generating a summary board including the at least one item, the summary board associating with the at least one item the first aggregation and the second aggregation. A summary board may include a table with items (e.g., individual items presented in horizontal rows) defining objects or entities that are managed in the platform (such as tasks, projects, clients, deals, or other information), as discussed herein. The summary board may represent information in a same or a condensed manner as compared to how it is presented in the first board and/or the second board, such as through one or more graphical representations, dashboards, widgets, tables or tabulations, flowcharts, maps, bar charts, circle charts, pie charts, alphanumeric characters, symbols, pictures, a combination thereof, or any other method for indicating information in a same or condensed manner as compared to its original source. In embodiments where the first board and the second board include tablature, summarizing may involve adding, editing, deleting, or otherwise modifying a variable or other information in the first board and/or the second board. The summary board may be generated automatically, manually, or a combination thereof, such as a result of a mouse click, a cursor hover, a mouseover, a button press, a keyboard input, a voice command, an interaction performed in virtual or augmented reality, or any other action by a user received via the at least one processor.

Figure 14:
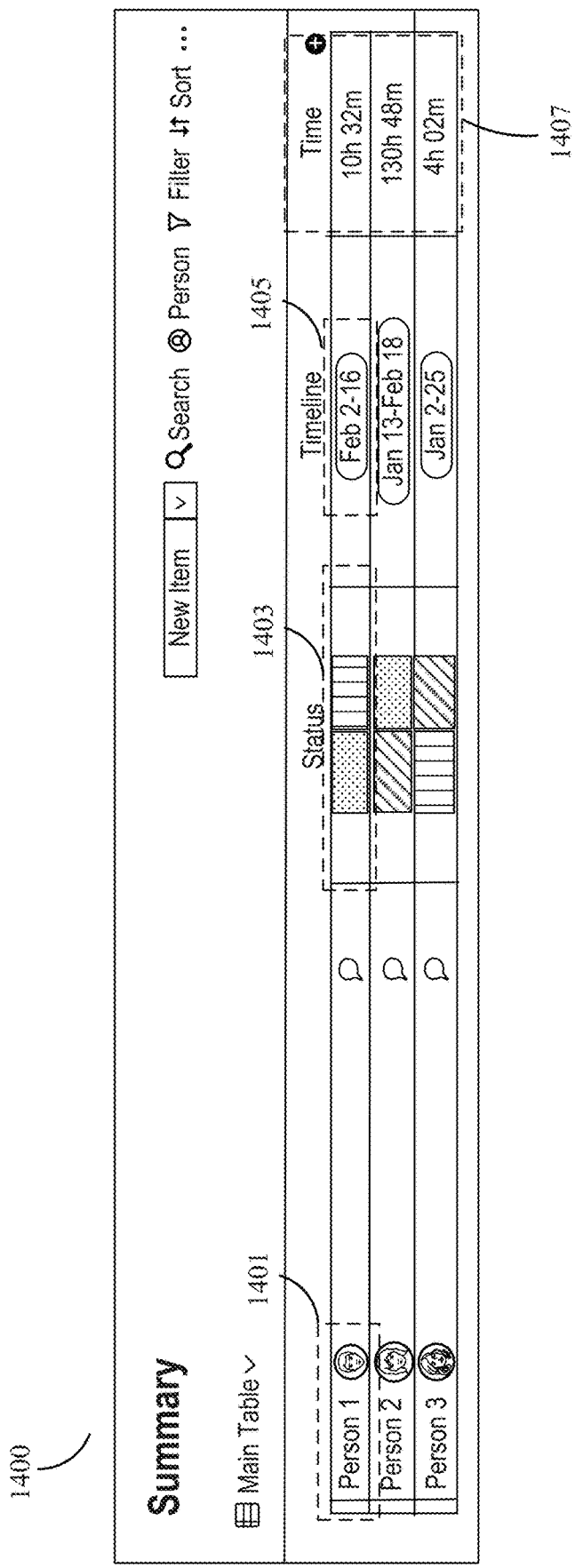
FIG. 14 illustrates an exemplary summary board, consistent with some embodiments of the present disclosure.

For example, FIG. 14, illustrates an exemplary summary board 1400 associating with the at least one item, the first aggregation and the second aggregation, consistent with embodiments of the present disclosure. As shown in FIG. 14, summary board 1400 may include a table including multiple horizontal rows, such as rows representing "Person 1," "Person 2," and "Person 3." In this illustration, "Person 1" item 1401 may be an item contained in both first board 1200 in FIG. 12 and second board 1300 in FIG. 13, as discussed above. Each row in summary board 1400 may include one or more aggregations associated with an individual (e.g., "Person 1" 1401), such as aggregated status information indicated as "Status" cell 1403 (representing an aggregation of "Done" cell 1203 in FIG. 12 and "CRITICAL" cell 1303 in FIG. 13), and aggregated timeline information indicated as "Timeline" cell 1305 (representing an aggregation of "Feb 16" cell 1205 in FIG. 12 and "Feb 2-8" cell 1305 in FIG. 13). As shown in FIG. 14, aggregated status information may be illustrated as two or more color blocks, and aggregated timeline information may be illustrated as a range of dates. Other depictions of aggregated information may be used depending on the aggregated information, as would be appreciated by those having ordinary skill in the art.

In some embodiments, the summary board may associate with the at least one item the first aggregation and the second aggregation. The association between the at least one item with the first aggregation and the second aggregation may be direct or indirect, and may be through any connection, linkage, relationship, instruction, signal, logic table, logical rule, logical combination rule, logical template, or any suitable element or operation for accessing, referring, displaying, or otherwise making available the first aggregation and the second aggregation. For example, in embodiments where the summary board includes rows and columns, the at least one item may be represented as a row, and the first aggregation and the second aggregation may be associated with the row as one or more items in the columns of the row. Other ways of associating the at least one item and the first aggregation and the second aggregation may include one or more graphical representations, dashboards, widgets, tables or tabulations, flowcharts, maps, bar charts, circle charts, pie charts, alphanumeric characters, symbols, pictures, a combination thereof, or any other content of information, as discussed herein.

For example, in FIG. 14, "Person 1" item 1401 is depicted as a row having multiple items in multiple columns, such as status cell 1403, timeline cell 1405, and a time cell (e.g., a cell in "Time" column 1407). In this non-limiting example, status cell 1403 and timeline cell 1405 may be associated with "Person 1" item 1401 by virtue of being part of the same row. In some embodiments, however, association may be depicted as a graphical representation, such as battery chart 401, line chart, 403, or bar chart 405 in FIG. 4.

In some embodiments, as a result of the association, when aggregated information in the first board and/or the second board changes, the information in the at least one item of the summary board may change to reflect the change in information. Further, the association of the at least one item in the summary board with the first aggregation and the second aggregation may persist through modifications in the first board and/or the second board, such as through duplications, additions, deletions, or any other alterations. In such embodiments, for example, an original first board and/or an original second board may be duplicated as a result of a user action or automatically by the system, resulting in a duplicate first board and/or a duplicate second board, respectively. As a result of the duplication, the association of the at least one item in the summary board may similarly be added onto the duplicate first board and/or the duplicate second board. Accordingly, when information changes in either the original first board or the duplicate first board, the first aggregation associated with the at least one item in the summary board may be adjusted automatically to reflect the change. Similarly, when information changes either in the original second board or the duplicate second board, the second aggregation associated with the at least one item in the summary board may be adjusted automatically to reflect the change. In this manner, the summary board may reflect up-to-date information of all relevant lower level tablature without additional input from the user.

Some disclosed embodiments may be further configured to electronically associate one of the first heading and the third heading with the first aggregation. The association between one of the first heading and the third heading with the first aggregation may be direct or indirect, and may be through any connection, linkage, relationship, instruction, signal, logic table, logical rule, logical combination rule, logical template, or any suitable element or operation for accessing, referring, displaying, or otherwise making available the first heading and/or the third heading, similar to the discussion above. For example, in embodiments where the first aggregation is contained in a cell that is an intersection between a row and a column, the first heading and/or the third heading may be displayed as a row heading, a column heading, or both. Other ways of associating one of the first heading and the third heading with the first aggregation may include using one or more graphical representations, alphanumeric characters, symbols, pictures, videos, AR or VR objects, a combination thereof, or any other content of information. For example, in embodiments where the first aggregation is depicted as a bar in a bar chart, the first heading and/or the third heading may be depicted as a text, image, avatar, video, or any other graphical representation under or near the bar in the bar chart. Further in some embodiments, the association may include depicting both the first heading and the third heading, a portion of the first heading, a portion of the third heading, a combination of the first heading and the third heading, or any other information related to the first heading and/or the third heading.

For example, in FIG. 14, status cell 1403 may be an aggregation of "Done" cell 1203 in FIG. 12 and "CRITICAL" cell 1303 in FIG. 13. In this illustration, status cell 1403 in FIG. 14 has a column heading of "Status," which is the same column heading as "Done" cell 1203 in FIG. 12. However, in some embodiments, status cell 1403 in FIG. 14 may have a column heading of "Priority," which is the same column heading as "CRITICAL" cell 1303 in FIG. 13. Further, in some embodiments, the heading may include both "Status" and "Priority," a portion of "Status," a portion of "Priority," a combination of the two, or any other information related to the terms "Status" and "Priority."

Some disclosed embodiments may be further configured to electronically associate one of the second heading and the fourth heading with the second aggregation. The association between one of the second heading and the fourth heading with the second aggregation may be done in a same or similar manner as the association between one of the first heading and the third heading with the first aggregation discussed herein. For example, in embodiments where the second aggregation is contained in a cell that is an intersection between a row and a column, the second heading and/or the fourth heading may be displayed as a row heading, a column heading, or both. Similarly, in embodiments where the second aggregation is depicted as a bar in a bar chart, the second heading and/or the fourth heading may be depicted as a text, image, avatar, video, or any other graphical representation under or near the bar in the bar chart. Further in some embodiments, the association may include depicting both the second heading and the fourth heading, a portion of the second heading, a portion of the fourth heading, a combination of the second heading and the fourth heading, or any other information related to the second heading and/or the fourth heading.

For example, in FIG. 14, "Feb 2-16" cell 1405 may be an aggregation of "Feb 16" cell 1205 in FIG. 12 and "Feb 2-8"

cell 1305 in FIG. 13. In this illustration, "Feb 2-16" cell 1405 in FIG. 14 has a column heading of "Timeline," which is the same column heading as "Feb 2-8" cell 1305 in FIG. 13. However, in some embodiments, "Feb 2-16" cell 1405 in FIG. 14 may have a column heading of "Due Date," which is the same column heading as "Feb 16" cell 1205 in FIG. 12. Further, in some embodiments, the heading may include both "Due Date" and "Timeline," a portion of "Due Date," a portion of "Timeline," a combination of the two, or any other information related to the terms "Due Date" and "Timeline."

In some embodiments, the first aggregation may include an indicator that summarizes the first type of information and the third type of information. An indicator may be any depiction suitable for the type of summarized information, including one or more pictures, alphanumeric characters, avatars, videos, VR or AR objects, graphs, metadata, or any combination thereof. For example, in embodiments where a type of information summarizes individuals associated with a project, the indicator may include a graphical representation of the individuals, such as a picture, avatar, name initials, or any other representation of the individuals. It is to be understood that any kind of indicator may be used depending on the type of information, and the disclosed embodiments are therefore not limited to any specific type of indicator.

For example, in FIG. 14, summary board 1400 may include an indicator in status cell 1403 that summarizes the first type of information and the third type of information, consistent with disclosed embodiments. As shown in FIG. 14, the indicator may be any suitable depiction, in this case color blocks representing the status information depicted by "Done" cell 1203 in FIG. 12 and the priority information depicted by "CRITICAL" cell 136 in FIG. 13. Any other suitable depiction of an indicator may be used, however, as explained herein.

In some embodiments, the second aggregation may include another indicator that summarizes the second type of information and the fourth type of information. The another indicator may be any depiction suitable for the type of summarized information, including one or more pictures, alphanumeric characters, avatars, videos, VR or AR objects, graphs, metadata, or any combination thereof, as discussed herein.

For example, in FIG. 14, summary board 1400 may include an indicator in timeline cell 1405 that summarizes the second type of information and the fourth type of information, consistent with disclosed embodiments. As shown in FIG. 14, the indicator may be any suitable depiction, in this case a range of dates depicted as "Feb 2-16" in timeline cell 1405, which aggregates the dates depicted by "Feb 16" cell 1205 in FIG. 12 and by "Feb 2-8" cell 1305 in FIG. 13. Any other suitable depiction of an indicator may be used, however, as explained herein.

In some embodiments, the indicator may be interactive to enable display of underlying information from the first type of information and the third type of information. An indicator may be interacted with in a manual, semi-manual, or automatic manner, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a cell or item in the summary board, the at least one processor may be configured to display a third board including the underlying information from the first type of information and the third type of information. In some embodiments, a user or the at least one processor may edit at least a portion of the underlying information directly from the display. For example, a user may modify one or more status cells in the first board by first interacting with a status summary cell in the third board, and subsequently editing the corresponding cells that are displayed as a result of the interaction.

Figures 15, 16:
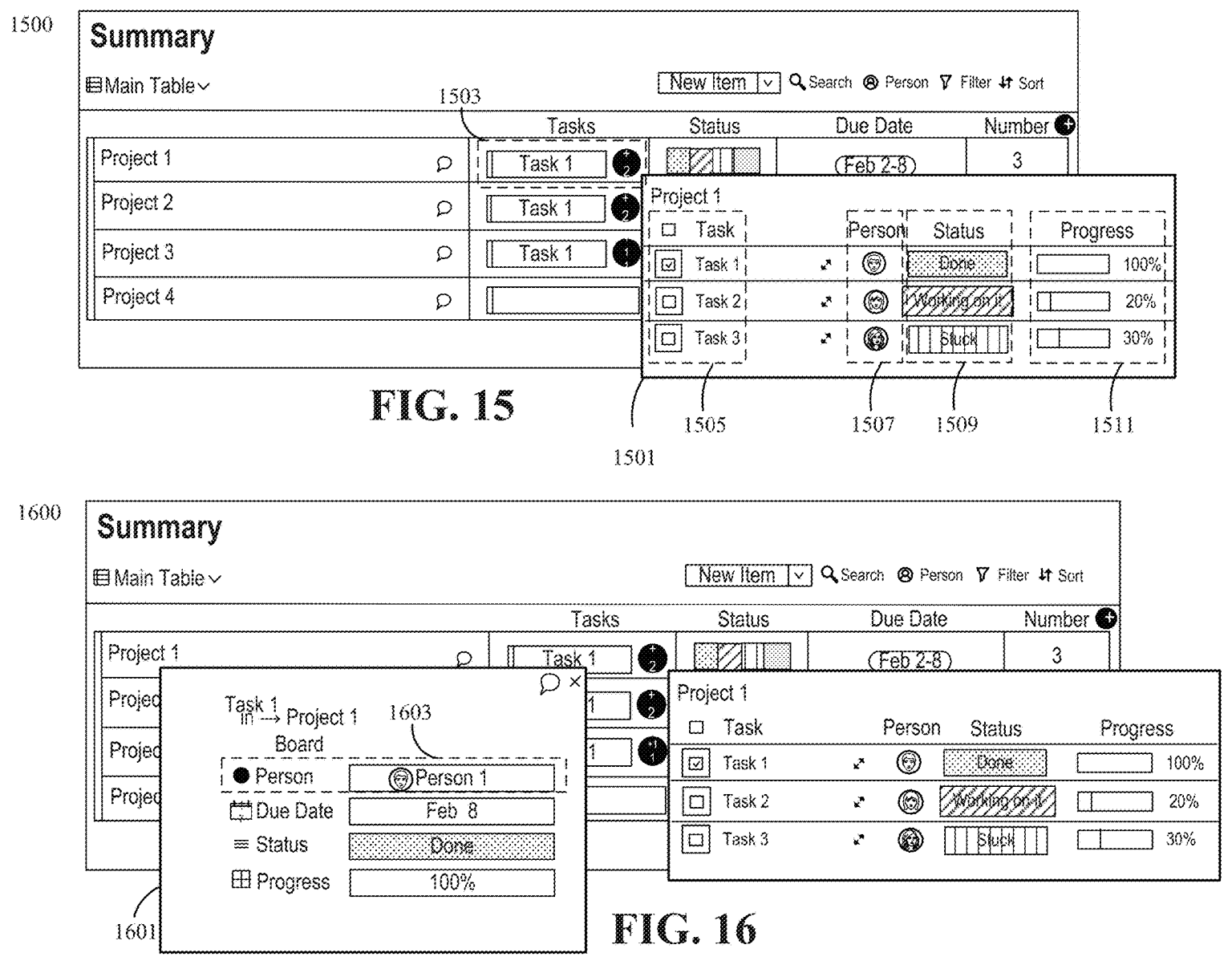

For example, FIG. 15 illustrates an exemplary display 1501 generated as a result of an interaction with an indicator, consistent with disclosed embodiments. Display 1501 may be overlaid on top of board 1500, which may be a summary board. Board 1500 may include an interactive indicator to generate display 1501, although any other indicators in board 1500 may be interactive. Consequently, display 1501 may be generated as a result of a user interaction, such as a mouse click, with indicator 1503. Display 1501 may include information associated with tasks in the first board, although in some embodiments it may display information associated with tasks in the second board, both boards, or any other board(s). Display 1501 may, for example, include a "Task" column 1505 representing tasks in the first board, a "Person" column 1507 representing individuals associated with each task in the first board, a "Status" column 1509 representing status information associated with each task in the first board, and a "Progress" column 1511 representing completion information associated with each task in the first board. Other information associated with the first board may be displayed, however. In addition, a user may edit information present on display 1501.

FIG. 16 illustrates an exemplary display 1601 for editing underlying information, consistent with disclosed embodiments. Display 1601 may be overlaid on top of board 1600, which may be summary board 1500 discussed above in FIG. 15. In FIG. 16, display 1601 may be generated as a result of a user interaction with an interactable indicator in board 1600, similar to display 1501 discussed above in connection with FIG. 15. Display 1601 in FIG. 16 may include one or more interactive elements that a user may utilize to edit information on the first board, the second board, or any other board, directly. For example, a user may interact with "Person 1" cell 1603 to edit information about individuals associated with "Task 1" in the first board. A user may do the same with the "Due Date," "Status," or "Progress" information in display 1601. In this way, a user may edit information in the underlying first board and second board directly from the third board or any other summary board, thereby saving time.

Some disclosed embodiments may be further configured to generate a fifth heading for the first aggregation. The fifth heading may be the same, similar, or different from the first, second, third, and/or fourth heading discussed herein. The fifth heading may be depicted as text, numbers, symbols, images, avatars, videos, AR or VR objects, or any other graphical representation, and may be associated with one or more horizontal presentations, vertical presentations, or both, as discussed herein. The fifth heading may include information associated with a task, name, status, project, country, person, team, progress, or any other feature or characteristic that may be associated with the information associated with one or more boards. The fifth heading may include a portion of the first heading associated with the first type of information, a portion of the third heading associated with the third type of information, a combination of the two, or any other information suitable for its content.

For example, in FIG. 14, the "Status" heading associated with status cell 1403 in summary board 1400 may be replaced with a fifth heading (not shown), consistent with disclosed embodiments. In such embodiments, the fifth heading may be different from "Status" as shown in FIG. 12 or "Priority" as shown in FIG. 13. The fifth heading may be a combination of both, such as "Status/Priority," or may be a portion of either, or any other suitable heading for the information, such as "Current Status," "State," or "Condition." In addition, the heading may be depicted as one or more images, videos, avatars, VR or AR objects, or any other representation, as discussed herein.

Figure 17:
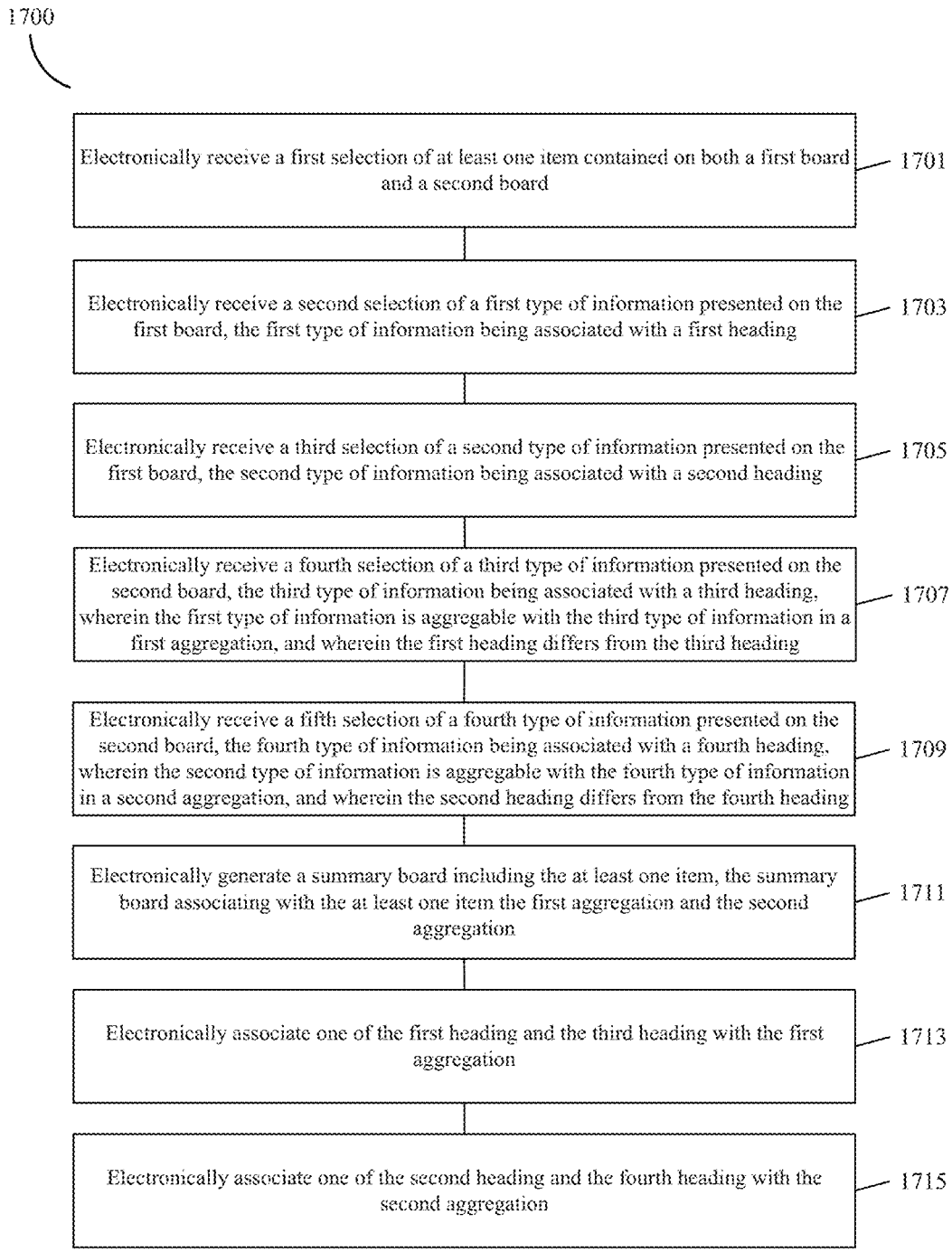
FIG. 17 is a block diagram of an example process for generating high level summary tablature based on lower level tablature, consistent with some embodiments of the present disclosure.

FIG. 17 illustrates a block diagram of an example process 1700 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 12 to 16 by way of example. In some embodiments, some aspects of the process 1700 may be implemented as software (e.g., program codes or instructions) that are stored in a memory (e.g., the memory portion 122 in FIG. 1) or a non-transitory computer-readable medium. In some embodiments, some aspects of the process 1700 may be implemented as hardware (e.g., a specific-purpose circuit). In some embodiments, the process 1700 may be implemented as a combination of software and hardware.

FIG. 17 includes process blocks 1701 to 1715. At block 1701, a processing means (e.g., the processing circuitry 110 in FIG. 1) may electronically receive a first selection of at least one item contained on both a first board and a second board (e.g., first board 1200 in FIG. 12 and second board 1300 in FIG. 13). At block 1703, the processing means may electronically receive a second selection of a first type of information presented on the first board, the first type of information being associated with a first heading (e.g., "Done" cell 1203 in FIG. 12).

At block 1705, the processing means may electronically receive a third selection of a second type of information presented on the first board, the second type of information being associated with a second heading (e.g., "Feb 16" cell 1205 in FIG. 12).

At block 1707, the processing means may electronically receive a fourth selection of a third type of information presented on the second board, the third type of information being associated with a third heading, wherein the first type of information is aggregable with the third type of information in a first aggregation, and wherein the first heading differs from the third heading (e.g., "CRITICAL" cell 1303 in FIG. 13). In some embodiments, the first aggregation may include an indicator that summarizes the first type of information and the third type of information. In some embodiments, the indicator may be interactive to enable display of underlying information from the first type of information and the third type of information (e.g., as shown in displays 1500 and 1600 in FIGS. 15 and 16, respectively).

In some embodiments, the processing means may be further configured to determine a similarity between the first type of information and the third type of information. In some embodiments, the similarity may be based on at least one of a position, a data type, a historical usage, or a logical rule.

At block 1709, the processing means may electronically receive a fifth selection of a fourth type of information presented on the second board, the fourth type of information being associated with a fourth heading, wherein the second type of information is aggregable with the fourth type of information in a second aggregation, and wherein the second heading differs from the fourth heading (e.g., "Feb 2-8" cell 1305 in FIG. 13). In some embodiments, the second aggregation may include another indicator that summarizes the second type of information and the fourth type of information.

At block 1711, the processing means may electronically generate a summary board including the at least one item, the summary board associating with the at least one item the first aggregation and the second aggregation (e.g., summary board 1400 in FIG. 14).

At block 1713, the processing means may electronically associate one of the first heading and the third heading with the first aggregation (e.g., "Status" heading in summary board 1400 in FIG. 14).

At block 1715, the processing means may electronically associate one of the second heading and the fourth heading with the second aggregation (e.g., "Timeline" heading in summary board 1400 in FIG. 14). In some embodiments, the processing may be further configured to generate a fifth heading for the first aggregation.

Consistent with some disclosed embodiments, systems, methods, and computer readable media for generating high level summary tablature based on lower level tablature are disclosed. The systems and methods described herein may be implemented with the aid of at least one processor or non-transitory computer readable medium, such as a CPU, FPGA, ASIC, or any other processing structure(s), as described herein.

Using computerized systems and methods for generating high level summary tablature using automatic identification of information types provides several advantages over extant processes that fail to provide aggregated information in a seamless and expedited manner. For example, extant systems and methods may fail to summarize large amounts of information in lower level tablature in an automatic manner that is convenient to the user. Using extant systems and methods, for example, a user may be required to manually identify aggregable data in two or more boards, and may be required to manually generate summary information. The computerized systems and methods disclosed herein may perform detection of information types, and may subsequently determine a similarity between them. Any information in the lower level tablature may be analyzed to make this determination, including data types, data content, board data, and any other information associated with the lower level tablature. The disclosed computerized systems and methods may generate summary data indicating similar information, facilitating a user's ability to understand information aggregated from the lower level tablature. Extant systems and methods may fail to identify types of information in a computerized manner, leading to a lower user satisfaction. Further, extant systems and methods may fail to identify items having a similarity in information in a computerized manner that affords convenience to the user.

The at least one processor may be configured to receive a selection of at least one item contained on both a first board and a second board, consistent with some disclosed embodiments. A board may include a table with items (e.g., individual items presented in horizontal rows) defining objects or entities that are managed in the platform (such as tasks, projects, clients, deals, or other information), as discussed herein. A board may include two or more different boards or tables, or may directly or indirectly access data from one or more other boards, tables, or other sources. A selection may include any automatic, semi-automatic, or manual signal, instruction, process, logical rule, logical combination rule, template, setting, a combination thereof, or any other operation for choosing information in a board. As non-limiting examples, a selection may include a mouse click, a cursor hover, a mouseover, a button press, a keyboard input, a voice command, an interaction performed in virtual or augmented reality, a default based on a user or system setting, a combination thereof, or any other signal received via the at least one processor. A selection of data presented on the first board and/or the second board may be received through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provides a medium for exchanging data.

Figures 18, 19:
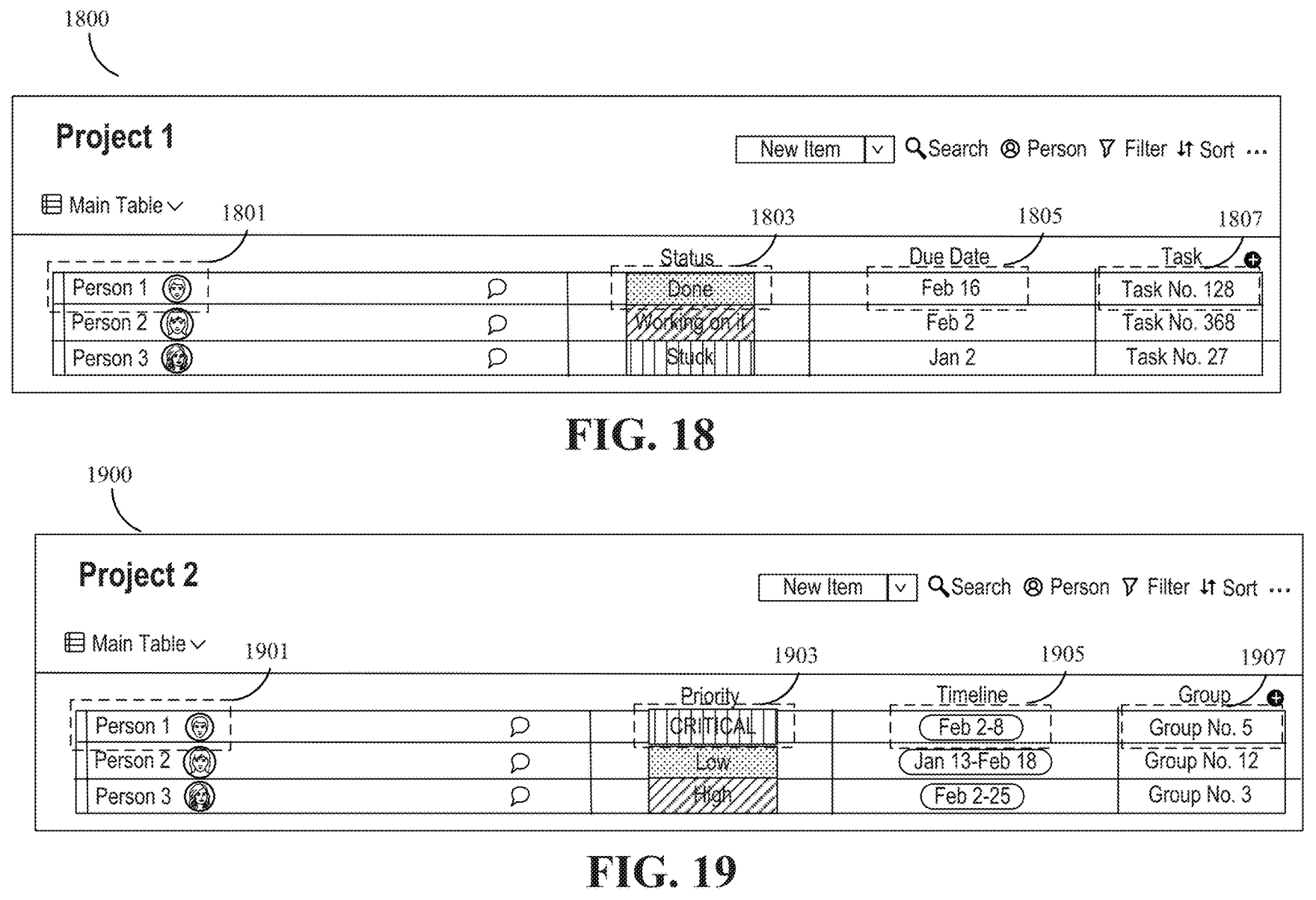

For example, FIG. 18, illustrates an exemplary first board 1800 the data of which may be selected, consistent with embodiments of the present disclosure. As shown in FIG. 18, first board 1800 may include a table including multiple horizontal rows, such as rows representing "Person 1," "Person 2," and "Person 3." Each row in first board 1800 may include task information associated with an individual (e.g., "Person 1" 1801) in a particular project (e.g., "Project 1"), such as status information indicated by "Done" cell 1803, deadline information indicated by "Feb 16" cell 1805, and task identification information indicated by "Task No. 128" cell 1807. First board 1800 may include other information associated with a task, or any other kind of information not related to tasks or workflow management information.

FIG. 19, illustrates an exemplary second board 1900 the data of which may be selected, consistent with embodiments of the present disclosure. In FIG. 19, second board 1900 may include a table including multiple horizontal rows, such as rows representing "Person 1," "Person 2," and "Person 3." Each row in second board 1900 may include task information associated with an individual (e.g., "Person 1" 1901) in a particular project (e.g., "Project 2"), such as priority information indicated by "CRITICAL" cell 1903, timeline information indicated by "Feb 2-8" cell 1905, and project group information indicated by "Group No. 5" cell 1907. Second board 1900 may include other information associated with a task, or any other kind of information not related to tasks or workflow management information.

As can be appreciated from comparing FIG. 18 with FIG. 19, first board 1800 and second board 1900 may include the same, similar, or different information. In FIGS. 18 and 19, for example, both boards may contain information on "Person 1," labeled as item 1801 in FIG. 18 and item 1901 in FIG. 19. In some embodiments, the at least one processor may be configured to electronically receive a selection of this item, or any other item contained on both the first board and the second board, as described above. In addition, both boards may include information on a current state of an individual's work with respect to a project, such as status information (e.g., "Done" cell 1803 in FIG. 18) and priority information (e.g., "CRITICAL" cell 1903 in FIG. 19). Both boards may also include information on one or more significant dates associated with the individual's work, such as due date information (e.g., "Feb 16" cell 1805 in FIG. 18) and timeline information (e.g., "Feb 2-8" cell 1905 in FIG. 19). However, as illustrated, the first board and the second board may include different information. For example, first board 1800 in FIG. 18 may include information on individual tasks (e.g., "Task No. 128" cell 1807), while second board 1900 in FIG. 19 may include information on project groups instead (e.g., "Group No. 5" cell 1907).

The at least one processor may be further configured to detect a first type of information presented on the first board, consistent with some disclosed embodiments. A type of information may represent any characteristic, feature, attribute, or any aspect related to data on a board. For example, in embodiments when the first board and the second board include workflow management information, a type of information may be associated with one or more status values, projects, countries, persons, teams, progresses, a combination thereof, or any other information related to a task. It is to be understood, however, that the disclosed embodiments are not limited to any particular type of information, but may rather be used in conjunction with any suitable type of information depending on the information contained in a board or depending on any other context. A detection may be the act of determining the presence or absence of a type of information, such as by analyzing data types, data content, board information, column information, row information, heading information, user interactions, user preferences, settings, historical data, formulas, logical rules, templates, adjacent or related information, functions or applications that utilize the two or more types of information, a combination thereof, or any other information available to or generated by the system. A type of information may be detected automatically, manually, or a combination thereof, such as through a mouse click, a cursor hover, a mouseover, a button press, a keyboard input, a voice command, an interaction performed in virtual or augmented reality, periodically, as a result of a default setting or user preference, as a result of a template, or through any other instruction received via the at least one processor. For example, in embodiments where a board contains multiple rows and columns, the at least one processor may detect the type of information in a column, a row, a cell, a graphical representation in the board, or any other data in the board. The detection may be performed automatically as the information is entered into the board, periodically (e.g., one or more times a day), as a result of a user pressing a button on the board, or as a result of any other event or signal.

For example, in FIG. 18, the system may detect a first type of information associated with "Done" cell 1803 in first board 1800, consistent with disclosed embodiments. The detection may be automatic (e.g., periodic), a result of a user interaction (e.g., a mouse click), or a combination of both, as discussed herein. In such embodiments, the first type of information associated with the second selection may be status information, since "Done" cell 1803 may be indicative of a state of a task in a cell, although any other type of information may be used depending on other information contained in first board 1800 or any other context.

In some embodiments, the first type of information may be associated with a first heading. In such embodiments, the first board and/or the second board may include one or more tablature having one or more headings defining or indicating a category or attribute associated with the information in that row. A heading may be depicted as text, numbers, symbols, images, avatars, videos, AR or VR objects, or any other graphical representation. A heading may be associated with one or more horizontal presentations, vertical presentations, or both, as discussed further below. For example, in embodiment where the first board and the second board include columns and rows, the columns and rows may have headings associated with their content, such as a task, name, status, project, country, person, team, progress, or any other feature or characteristic that may be associated with the information associated with a particular column or row.

For example, in FIGS. 18 and 19, first board 1800 and second board 1900 may include one or more headings. As illustrated in FIGS. 18 and 19, a heading may be associated with an individual in a horizontal row, such as "Person 1," "Person 2," and "Person 3." A heading may also be associated with a vertical column, such as the "Status," "Due Date," and "Task" headings shown in FIG. 18, or the "Priority," "Timeline," and "Group" headings shown in FIG. 19. Following the example above, the first type of information associated with "Done" cell 1803 may be status information, which is associated with the "Status" column heading in first board 1800.

The at least one processor may be further configured to detect a second type of information presented on the first board, consistent with disclosed embodiments. The second type of information may be detected in the same or similar manner as the first type of information, as discussed previously. In some embodiments, the second type of information may be associated with a second heading. The second type of information may be the same, similar, or different from the first type of information discussed previously. Likewise, the second heading may be the same, similar, or different from the first heading as discussed previously.

For example, in FIG. 18, the system may detect a second type of information associated with "Feb 16" cell 1805 in first board 1800, consistent with disclosed embodiments. In such embodiments, the second type of information may be deadline information, since "Feb 16" cell 1805 is indicative of a significant date of a task, although any other type of information may be used depending on other information in first board 1800 or any other context. In this case, the second type of information associated with "Feb 16" cell 1805 may be due date information, which is associated with the "Due Date" column heading in first board 1800.

The at least one processor may be further configured to detect a third type of information presented on the second board, consistent with disclosed embodiments. The third type of information may be detected in the same or similar manner as the first and/or second type of information as discussed previously. In some embodiments, the third type of information may be associated with a third heading different from the first heading. The third type of information may be the same, similar, or different from the first and/or second type of information discussed above. Likewise, the third heading may be the same, similar, or different from the first and/or second heading discussed previously.

For example, in FIG. 18, the system may detect a third type of information associated with "CRITICAL" cell 1903 in second board 1900, consistent with disclosed embodiments. In such embodiments, the third type of information may be priority information, since "CRITICAL" cell 1905 is indicative of an urgency status of a task, although any other type of information may be used depending on other information in second board 1900 or any other context. In this case, the third type of information of "CRITICAL" cell 1905 may be priority information, which is associated with the "Priority" column heading in second board 1900.

The at least one processor may be further configured to detect a fourth type of information presented on the second board, consistent with disclosed embodiments. The fourth type of information may be detected in the same or similar manner as the first, second, and/or third type of information as discussed previously. In some embodiments, the fourth type of information may be associated with a fourth heading different from the second heading. The fourth type of information may be the same, similar, or different from the first, second, and/or third type of information discussed previously. Likewise, the fourth heading may be the same, similar, or different from the first, second, and/or third heading discussed previously.

For example, in FIG. 18, the system may detect a fourth type of information associated with "Feb 2-8" cell 1905 in second board 1900, consistent with disclosed embodiments. In such embodiments, the fourth type of information may be timeline information, since "Feb 2-8" cell 1905 is indicative of a range of significant dates of a task, although any other type of information may be used depending on other information in second board 1900 or any other context. In this case, the fourth type of information associated with "Feb 2-8" cell 1905 may be timeline information, which is associated with the "Timeline" column heading in second board 1900.

The at least one processor may be further configured to analyze characteristics of the first type of information, the second type of information, the third type of information, and the fourth type of information, to ascertain that the first type of information is aggregable with the third type of information, and that the second type of information is aggregable with the fourth type of information, consistent with disclosed embodiments. Characteristics may be analyzed by identifying and examining relationships between two or more types of information, such as by examining data types, data content, board data, column data, row data, heading data, user interactions, user preferences, settings, historical data, formulas, logical rules, templates, adjacent or related information, functions or applications that utilize the two or more types of information, a combination thereof, or any other information available to or generated by the system. Two or more types of information may be aggregable based on a shared characteristic or other relationship indicating a commonality between the two or more types of information.

For example, in FIGS. 18 and 19, a first type of information associated with "Done" cell 1803 in FIG. 18 may be aggregable with a third type of information associated with "CRITICAL" cell 1903 in FIG. 19, consistent with disclosed embodiments. In this non-limiting example, because the type of information of "Done" cell 1803 in FIG. 18 is status information, and the type of information of "CRITICAL" cell 1903 in FIG. 19 is priority information, these two types of information may be aggregable despite having differing headings since they both relate to a state of a task associated with an individual.

Similarly, in FIGS. 18 and 19, a second type of information associated with "Feb 16" cell 1805 in FIG. 18 may be aggregable with a fourth type of information associated with "Feb 2-8" cell 1905 in FIG. 19, consistent with disclosed embodiments. In this non-limiting example, because the type of information of "Feb 16" cell 1805 in FIG. 18 is due date information, and the type of information of "Feb 2-8" cell 1905 in FIG. 19 is timeline information, these two types of information may be aggregable despite having differing headings since they both relate to calendar information of a task associated with an individual.

In some embodiments, each of the first type of information, the second type of information, the third type of information, and the fourth type of information may include associated metadata. Metadata may include any data related to a type of information, such as tags, author, date created, date modified, date viewed, files, file size, links, notes, board data, widget data, column data, row data, heading data, a combination thereof, or any other information corresponding to the data represented by the type of information. It is to be understood that metadata may include any information related to the data corresponding to the type of information or any associated context.

Figure 20:
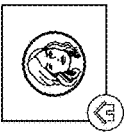
FIG. 20 illustrates exemplary metadata, consistent with some embodiments of the present disclosure.

For example, FIG. 20 illustrates a board 2000 that may contain metadata associated with at least one item, consistent with disclosed embodiments. As shown in FIG. 20, metadata 2003 associated with a cell, such as "Done" cell 2001, may be displayed. Metadata 2003 may include any information associated with the cell, in this case a status, such as the creator the author of the status, the creation date of the status, the date of the last update of the status, and email information for the author of the status.

In some embodiments, analyzing characteristics may include analyzing the associated metadata to ascertain that the first type of information is aggregable with the third type of information, and that the second type of information is aggregable with the fourth type of information. Metadata may be analyzed by identifying and examining relationships between metadata associated with two or more types of information, as discussed previously. In embodiments where metadata is analyzed, the system may determine that two types of information are aggregable because they include the same or similar metadata, as defined above. For example, if two or more types of information are created by the same author, the system may determine that the two or more types of information are aggregable. It is to be understood that any other metadata may be used to make this determination.

In some embodiments, the associated metadata may be based on a position. A position may relate to any relational placement with respect to surrounding information, such as placement in a column, row, board, widget, graph, graphical representation, or any other structural data arrangement. In embodiments where the metadata may be based on a position, the system may determine that two types of information are aggregable as a result of having the same or similar position in the structural data arrangement. As a non-limiting example, in embodiments where the first board and the second board include tablature having rows and columns, the system may determine that the first type of information and the third type of information are aggregable if they are located in the same column in the first board and the second board, respectively. Other positional and structural information may be used, as would be understood by a person having ordinary skill in the art.

For example, in FIGS. 18 and 19, the system may determine that the type of information associated with "Done" cell 1803 in FIG. 18 may are aggregable with the type of information associated with "CRITICAL" cell 1903 in FIG. 19 based on position. In this non-limiting example, because the column containing "Done" cell 1803 in FIG. 18 is the second left-most column in board 1800, and the column containing "CRITICAL" cell 1903 in FIG. 19 is also the second left-most column in board 1900, the system may determine that these two columns are aggregable based on position.

In some embodiments, the associated metadata may be based on a data type. Data types may include text, numbers, calendar information, formulas, time, files, multi-select data, tags, check boxes, a combination thereof, or any other attribute of information. In embodiments where the metadata may be based on a data type, the system may determine that two types of information are aggregable as a result of having the same or similar data types. For example, the first type of information may include one or more cells with a range of dates associated with a timeline, such as "December 8-February 12," and the third type of information may also include one or more cells with a range of dates associated with a timeline, such as "December 8-February 18." In such cases, the system may determine that the two types of information are aggregable because both have the same type of data, in this case calendar information. The system may arrive at the same result if the two types of information are similar, such as numbers compared to formulas, numerical strings compared to numbers, persons compared to groups, emails compared to names, and any other data types that relate to one another. Conversely, the first type of information may include one or more cells including status information, such as "Done," and the third type of information may include one or more cells including telephone numbers associated with a person, such as "+123 45 678 9123." In such cases, the system may determine that the two types of information are not aggregable because they do not share the same data type, in this case text and numbers (although in some embodiments there may be sufficient relationship between the two to constitute aggregability). Other data types and combinations may be used, as would be understood by a person having ordinary skill in the art.

For example, in FIGS. 18 and 19, the system may determine that the type of information associated with "Feb 16" cell 1805 in FIG. 18 may be aggregable with the type of information associated with "Feb 2-8" cell 1905 in FIG. 19 based on data types. In this non-limiting example, because "Feb 16" cell 1805 in FIG. 18 contains calendar data, and "Feb 2-8" cell 1905 in FIG. 19 also contains calendar data, the system may determine that these two types of information are aggregable based on data type.

In some embodiments, the associated metadata may be based on a historical usage. Historical data may include any information previously utilized or generated by the system, such as one or more previous signals, instructions, operations, functions, database retrievals, inputs received from one or more users, user preferences, default settings, interactions with a board or tablature, graphical representations, or any other information associated with the system. In embodiments where the metadata may be based on a historical usage, the system may determine that two types of information are aggregable as a result of having previously been subject to the same or similar historical usage. For example, if the system previously aggregated the first type of information and the third type of information, such as in the form of a summary, graphical representation (e.g., charts), or any other aggregation, the system may determine that the two types of information are aggregable as a result of this historical information. In other embodiments, the system may determine that two types of information are aggregable because a user previously aggregated them, such as by combining the two types of data, generating graphical representations (e.g., charts) of them, or selecting them to be similar as a user preference. Other historical usages may be used, as would be understood by a person having ordinary skill in the art.

In some embodiments, the associated metadata may be based on a logical rule. A logical rule may be any function for causing the system to perform an action on information contained in a board, such as one or more notification generation rules, sound generation rules, data generation rules, data aggregation rules, column rules, row rules, default rules, logical templates, settings, operations, instructions, signals, or any other electronic prompt for causing the system to perform an action. In embodiments where the metadata may be based on a logical rule, the system may determine that two types of information are aggregable as a result of being subject to the same or similar logical rule. As a non-limiting example, in embodiments where the system generates one or more notifications (e.g., email messages) to a particular user as a result of a change in two types of information, the system may determine that the two types of information are aggregable as a result of being subject to the same notification generation rule. Other logical rules may be utilized depending on the information contained in the first board and the second board, and any inputs received by the system, as would be understood by those having ordinary skill in the art.

As an illustration, in FIGS. 18 and 19, the system may determine that the type of information associated with "Done" cell 1803 in FIG. 18 may be aggregable with the type of information associated with "CRITICAL" cell 1903 in FIG. 19 based on a logical rule. If the system is configured to generate an email notification to "Person 1" as a result of a change in status information (e.g., "Stuck") and a change in priority information (e.g., "CRITICAL"), the system may determine that these two types of information are aggregable.

The at least one processor may be further configured to present the at least one item on a third board, consistent with disclosed embodiments. A third board may include a table with items (e.g., individual items presented in horizontal rows) defining objects or entities that are managed in the platform (such as tasks, projects, clients, deals, or other information). The third board and any items contained therein may be presented using any visual, tactile, or any other physical representation, such as through the use of one or more mobile devices, desktops, laptops, tablets, LED, AR devices, VR devices, or a combination thereof, as described previously.

The at least one processor may be further configured to aggregate on the third board, in association with the at least one item, the first type of information with the third type of information, and the second type of information with the fourth type of information, consistent with disclosed embodiments. The third board may represent information in a same or a condensed manner as compared to how it is presented in the first board and/or the second board, such as through one or more graphical representations, dashboards, widgets, tables or tabulations, flowcharts, maps, bar charts, circle charts, pie charts, alphanumeric characters, symbols, pictures, a combination thereof, or any other method for indicating information in a same or condensed manner as compared to its original source. In embodiments where the first board and the second board include tablature, aggregation may involve adding, editing, deleting, or otherwise modifying a variable or other information in the first board and/or the second board.

Figure 21:
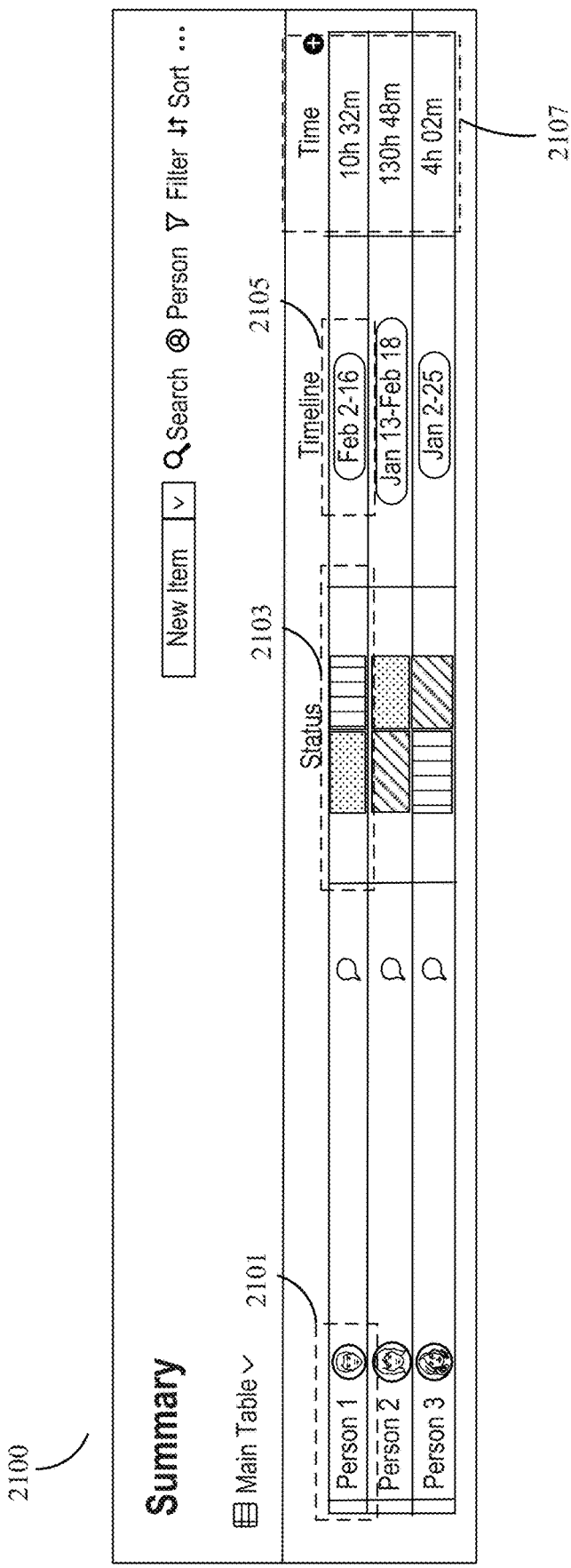
FIG. 21 illustrates an exemplary summary board, consistent with some embodiments of the present disclosure.

For example, FIG. 21, illustrates an exemplary summary board 2100, consistent with embodiments of the present disclosure. As shown in FIG. 21, summary board 2100 may include a table including multiple horizontal rows, such as rows representing "Person 1," "Person 2," and "Person 3." In this illustration, "Person 1" item 2101 may be an item contained in both first board 1800 in FIG. 18 and second board 1900 in FIG. 19, as discussed above. Each row in summary board 2100 may include one or more aggregations associated with an individual (e.g., "Person 1" 2101), such as aggregated status information indicated as "Status" cell 2103 (representing an aggregation of "Done" cell 1803 in FIG. 18 and "CRITICAL" cell 1903 in FIG. 19), and aggregated timeline information indicated as "Timeline" cell 1905 (representing an aggregation of "Feb 16" cell 1805 in FIG. 18 and "Feb 2-8" cell 1905 in FIG. 19). As shown in FIG. 21, aggregated status information may be illustrated as two or more color blocks, and aggregated timeline information may be illustrated as a range of dates. Other depictions of aggregated information may be used depending on the aggregated information, as would be appreciated by those having ordinary skill in the art.

In some embodiments, as a result of the association, when aggregated information in the first board and/or the second board changes, the information in the at least one item of the third board may change to reflect the change in information. Further, the association of the at least one item in the third board with the types of information may persist through modifications in the first board and/or the second board, such as through duplications, additions, deletions, or any other alterations. In such embodiments, for example, an original first board and/or an original second board may be duplicated as a result of a user action or automatically by the system, resulting in a duplicate first board and/or a duplicate second board, respectively. As a result of the duplication, the association of the at least one item in the third board may similarly be added onto the duplicate first board and/or the duplicate second board. Accordingly, when information changes in either the original first board or the duplicate first board, the first aggregation associated with the at least one item in the third board may be adjusted automatically to reflect the change. Similarly, when information changes either in the original second board or the duplicate second board, the second aggregation associated with the at least one item in the third board may be adjusted automatically to reflect the change. In this manner, the third board may reflect up-to-date information of all relevant lower level tablature without additional input from the user.

The at least one processor may be further configured to generate a first indicator that summarizes the first type of information and the third type of information, consistent with disclosed embodiments. An indicator may be any depiction suitable for the type of summarized information, including one or more pictures, alphanumeric characters, avatars, videos, VR or AR objects, graphs, metadata, or any combination thereof. For example, in embodiments where a type of information summarizes individuals associated with a project, the indicator may include a graphical representation of the individuals, such as a picture, avatar, name initials, or any other representation of the individuals. It is to be understood that any kind of indicator may be used depending on the type of information, and the disclosed embodiments are therefore not limited to any specific type of indicator.

For example, in FIG. 21, summary board 2100 may include an indicator in status cell 2103 that summarizes the first type of information and the third type of information, consistent with disclosed embodiments. As shown in FIG. 21, the indicator may be any suitable depiction, in this case color blocks representing the status information depicted by "Done" cell 1803 in FIG. 18 and the priority information depicted by "CRITICAL" cell 196 in FIG. 19. Any other suitable depiction of an indicator may be used, however, as explained herein.

The at least one processor may be further configured to generate a second indicator that summarizes the second type of information and the fourth type of information, consistent with disclosed embodiments. The second indicator may be any depiction suitable for the type of summarized information, including one or more pictures, alphanumeric characters, avatars, videos, VR or AR objects, graphs, metadata, or any combination thereof, as discussed herein.

For example, in FIG. 21, summary board 2100 may include an indicator in timeline cell 2105 that summarizes the second type of information and the fourth type of information, consistent with disclosed embodiments. As shown in FIG. 21, the indicator may be any suitable depiction, in this case a range of dates depicted as "Feb 2-16" in timeline cell 2105, which aggregates the dates depicted by "Feb 16" cell 1805 in FIG. 18 and by "Feb 2-8" cell 196 in FIG. 19. Any other suitable depiction of an indicator may be used, however, as explained herein.

In some embodiments, indicator may be interactive to enable display of underlying information from the first type of information and the third type of information. An indicator may be interacted with in a manual, semi-manual, or automatic manner, such as through a mouse click, a cursor hover, a mouseover, a button press, a keyboard input, a voice command, an interaction performed in virtual or augmented reality, periodically, as a result of a user preference, as a result of a template, or through any other instruction received via the at least one processor. For example, as a result of a user interacting with (e.g., clicking) a cell or item in the summary board, the at least one processor may be configured to display a third board including the underlying information from the first type of information and the third type of information. In some embodiments, a user or the at least one processor may edit at least a portion of the underlying information directly from the display. For example, a user may modify one or more status cells in the first board by first interacting with a status summary cell in the third board, and subsequently editing the corresponding cells that are displayed as a result of the interaction.

Figures 22, 23:
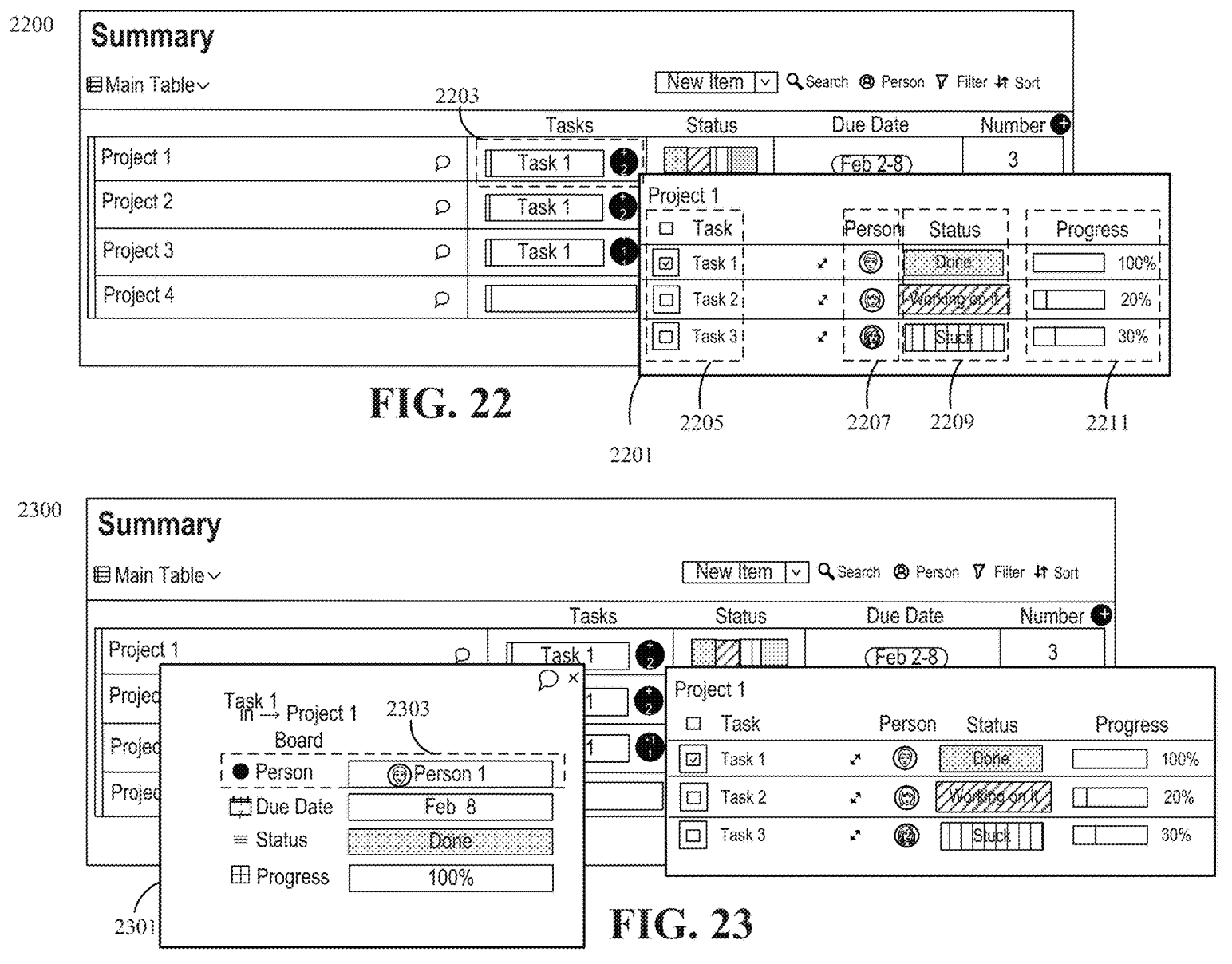

For example, FIG. 22 illustrates an exemplary display 2201 generated as a result of an interaction with an indicator, consistent with disclosed embodiments. Display 2201 may be overlaid on top of board 2200, which may be a summary board. Board 2200 may include an interactive indicator to generate display 2201, although any other indicators in board 2200 may be interactive. Consequently, display 2201 may be generated as a result of a user interaction, such as a mouse click, with indicator 2203. Display 2201 may include information associated with tasks in the first board, although in some embodiments it may display information associated with tasks in the second board, both boards, or any other board(s). Display 2201 may, for example, include a "Task" column 2205 representing tasks in the first board, a "Person" column 2207 representing individuals associated with each task in the first board, a "Status" column 2209 representing status information associated with each task in the first board, and a "Progress" column 2211 representing completion information associated with each task in the first board. Other information associated with the first board may be displayed, however. In addition, a user may edit information present on display 2201.

For example, FIG. 23 illustrates an exemplary display 2301 for editing underlying information, consistent with disclosed embodiments. Display 2301 may be overlaid on top of board 2300, which may be summary board 2200 discussed above in FIG. 22. In FIG. 23, display 2301 may be generated as a result of a user interaction with an interactable indicator in board 2300, similar to display 2201 discussed above in connection with FIG. 22. Display 2301 in FIG. 23 may include one or more interactive elements that a user may utilize to edit information on the first board, the second board, or any other board, directly. For example, a user may interact with "Person 1" cell 2303 to edit information about individuals associated with "Task 1" in the first board. A user may do the same with the "Due Date," "Status," or "Progress" information in display 2301. In this way, a user may edit information in the underlying first board and second board directly from the third board or any other summary board, thereby saving time.

The at least one processor may be further configured to generate a fifth heading for aggregating the first type of information with the third type of information, consistent with disclosed embodiments. The fifth heading may be the same, similar, or different from the first, second, third, and/or fourth heading discussed previously. The fifth heading may be depicted as text, numbers, symbols, images, avatars, videos, AR or VR objects, or any other graphical representation, and may be associated with one or more horizontal presentations, vertical presentations, or both, as discussed previously. The fifth heading may include information associated with a task, name, status, project, country, person, team, progress, or any other feature or characteristic that may be associated with the information associated with one or more boards. The fifth heading may include a portion of the first heading associated with the first type of information, a portion of the third heading associated with the third type of information, a combination of the two, or any other information suitable for its content.

For example, in FIG. 21, the "Status" heading associated with status cell 2103 in summary board 2100 may be replaced with a fifth heading (not shown), consistent with disclosed embodiments. In such embodiments, the fifth heading may be different from "Status" as shown in FIG. 18 or "Priority" as shown in FIG. 19. The fifth heading may be a combination of both, such as "Status/Priority," or may be a portion of either, or any other suitable heading for the information, such as "Current Status," "State," or "Condition." In addition, the heading may be depicted as one or more images, videos, avatars, VR or AR objects, or any other representation, as discussed previously.

Figure 24:
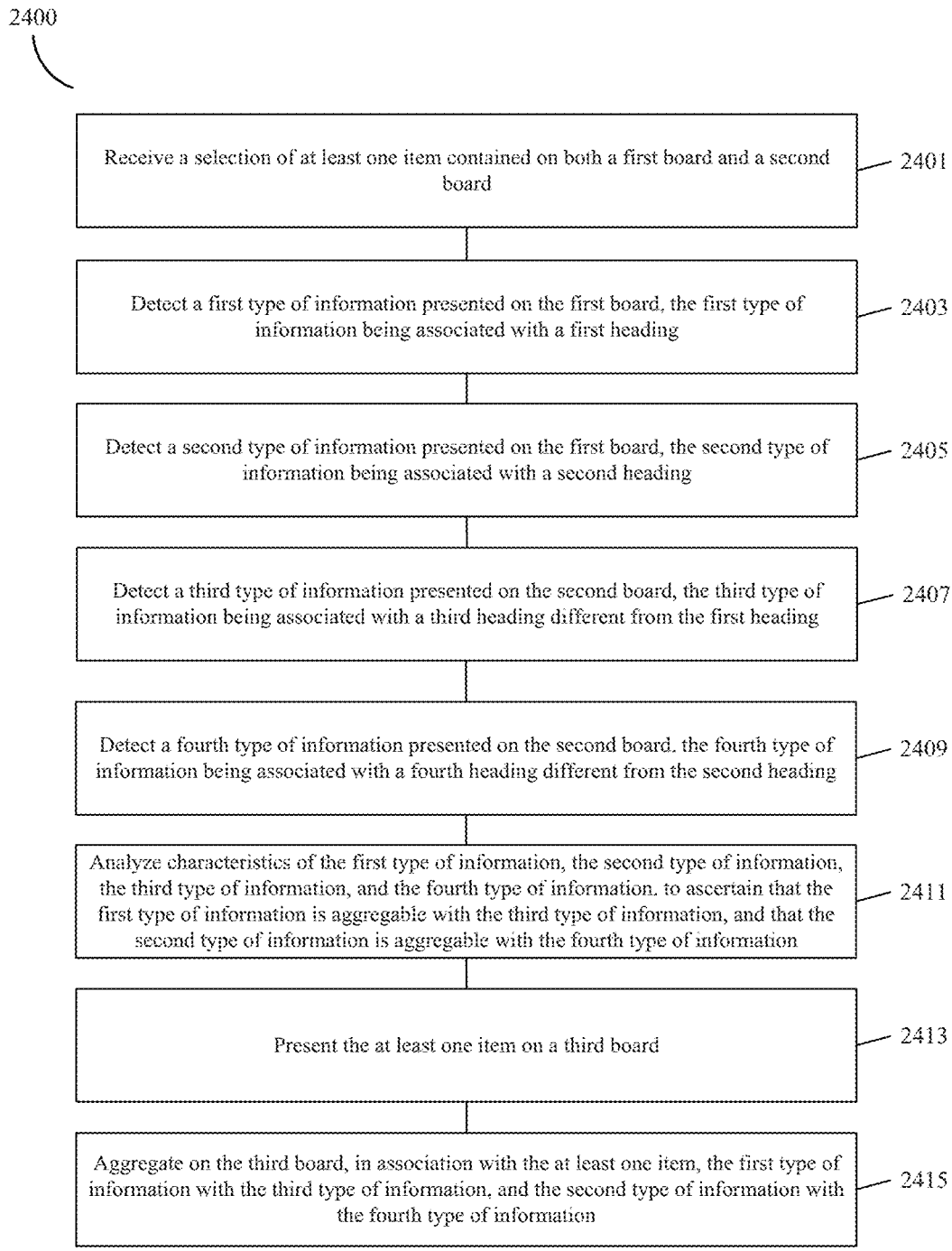
FIG. 24 is a block diagram of an example process for generating high level summary tablature based on lower level tablature, consistent with some embodiments of the present disclosure.

FIG. 24 illustrates a block diagram of an example process 2400 for generating high level summary tablature based on lower level tablature, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 2400 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 18 to 23 by way of example. In some embodiments, some aspects of the process 2400 may be implemented as software (e.g., program codes or instructions) that are stored in a memory (e.g., the memory portion 122 in FIG. 1) or a non-transitory computer-readable medium. In some embodiments, some aspects of the process 2400 may be implemented as hardware (e.g., a specific-purpose circuit). In some embodiments, the process 2400 may be implemented as a combination of software and hardware.

FIG. 24 includes process blocks 2401 to 2415. At block 2401, a processing means (e.g., the processing circuitry 110 in FIG. 1) may receive a selection of at least one item contained on both a first board and a second board (e.g., first board 1800 in FIG. 18 and second board 1900 in FIG. 19). At block 2403, the processing means may detect a first type of information presented on the first board, the first type of information being associated with a first heading (e.g., status information of "Done" cell 1803 in FIG. 18).

At block 2405, the processing means may detect a second type of information presented on the first board, the second type of information being associated with a second heading (e.g., due date information of "Feb 16" cell 1805 in FIG. 18).

At block 2407, the processing means may detect a third type of information presented on the second board, the third type of information being associated with a third heading different from the first heading (e.g., priority information of "CRITICAL" cell 1903 in FIG. 19).

At block 2409, the processing means may detect a fourth type of information presented on the second board, the fourth type of information being associated with a fourth heading different from the second heading (e.g., timeline information of "Feb 2-8" cell 1905 in FIG. 19).

At block 2411, the processing means may analyze characteristics of the first type of information, the second type of information, the third type of information, and the fourth type of information, to ascertain that the first type of information is aggregable with the third type of information, and that the second type of information is aggregable with the fourth type of information. In some embodiments, analyzing characteristics may include analyzing the associated metadata to ascertain that the first type of information is aggregable with the third type of information, and that the second type of information is aggregable with the fourth type of information (e.g., metadata 2003 in FIG. 20). In some embodiments, the associated metadata may be based on at least one of a position, a data type, a historical usage, or a logical rule.

At block 2413, the processing means may present the at least one item on a third board (e.g., summary board 2100 in FIG. 21). At block 2415, the processing means may aggregate on the third board, in association with the at least one item, the first type of information with the third type of information, and the second type of information with the fourth type of information (e.g., status cell 2101 and timeline cell 2105 in FIG. 21). In some embodiments, the processing means may be further configured to generate a fifth heading for aggregating the first type of information with the third type of information.

In some embodiments, the processing means may be further configured to generate a first indicator that summarizes the first type of information and the third type of information. In some embodiments, the processing means may be further configured to generate a second indicator that summarizes the second type of information and the fourth type of information. In some embodiments, indicator may be interactive to enable display of underlying information from the first type of information and the third type of information (e.g., as shown in FIGS. 22 and 23).

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- electronically accessing first data associated with a first board;
- electronically accessing second data associated with a second board;
- performing electronic semantic analysis to identify a portion of the first data associated with the first board and a portion of the second data associated with the second board that share a similarity;
- consolidating in a third board reflecting a similarity consolidation, the identified first portion and the identified second portion;
- summarizing the first portion;
- summarizing the second portion;
- aggregating the summarized first portion and the summarized second portion to form an aggregated summary;
- presenting on the third board the aggregated summary in a manner associating the aggregated summary with the similarity consolidation;
- wherein the first data and the second data include row headings;
- wherein the shared similarity includes a similarity between row headings;
- wherein identifying the shared similarity includes discovering a first plurality of common row headings in the first data, and discovering a second plurality of common row headings in the second data;
- wherein consolidating the identified similarity includes generating a singular entry in the third board consolidating the first plurality of common row headings and second plurality of common row headings;
- wherein the first data and the second data include status information;
- wherein the identified similarity between the first data and the second data includes common status information;
- wherein summarizing the first portion and the second portion includes counting common statuses within the first portion and the second portion;
- wherein the aggregated summary includes an indication of a number of entries that share a common status;
- wherein the manner associating the aggregated summary with the similarity consolidation includes displaying the similarity consolidation as a row heading and the aggregated summary in a cell associated with the row heading;
- wherein the cell includes a numeral or a summary representation;
- wherein the cell includes an active link;
- upon activation of the link, causing a display of at least one of the portion of the first data or the portion of the second data;
- electronically receiving a first selection of at least one item contained on both a first board and a second board;
- electronically receiving a second selection of a first type of information presented on the first board, the first type of information being associated with a first heading;
- electronically receiving a third selection of a second type of information presented on the first board, the second type of information being associated with a second heading;
- electronically receiving a fourth selection of a third type of information presented on the second board, the third type of information being associated with a third heading;
- wherein the first type of information is aggregable with the third type of information in a first aggregation;
- wherein the first heading differs from the third heading;
- electronically receiving a fifth selection of a fourth type of information presented on the second board, the fourth type of information being associated with a fourth heading;
- wherein the second type of information is aggregable with the fourth type of information in a second aggregation;
- wherein the second heading differs from the fourth heading;
- electronically generating a summary board including the at least one item, the summary board associating with the at least one item the first aggregation and the second aggregation;
- electronically associating one of the first heading and the third heading with the first aggregation;
- electronically associating one of the second heading and the fourth heading with the second aggregation;
- determining a similarity between the first type of information and the third type of information;
- wherein the similarity is based on at least one of a position, a data type, a historical usage, or a logical rule;
- generating a fifth heading for the first aggregation;
- wherein the first aggregation includes an indicator that summarizes the first type of information and the third type of information;

wherein the indicator is interactive to enable display of underlying information from the first type of information and the third type of information;

wherein the second aggregation includes another indicator that summarizes the second type of information and the fourth type of information;

receiving a selection of at least one item contained on both a first board and a second board;

detecting a first type of information presented on the first board, the first type of information being associated with a first heading;

detecting a second type of information presented on the first board, the second type of information being associated with a second heading;

detecting a third type of information presented on the second board, the third type of information being associated with a third heading different from the first heading;

detecting a fourth type of information presented on the second board, the fourth type of information being associated with a fourth heading different from the second heading;

analyzing characteristics of the first type of information, the second type of information, the third type of information, and the fourth type of information, to ascertain that the first type of information is aggregable with the third type of information, and that the second type of information is aggregable with the fourth type of information;

presenting the at least one item on a third board;

aggregating on the third board, in association with the at least one item, the first type of information with the third type of information, and the second type of information with the fourth type of information;

wherein each of the first type of information, the second type of information, the third type of information, and the fourth type of information includes associated metadata;

wherein analyzing characteristics includes analyzing the associated metadata to ascertain that the first type of information is aggregable with the third type of information, and that the second type of information is aggregable with the fourth type of information;

wherein the associated metadata is based on at least one of a position, a data type, a historical usage, or a logical rule;

generating a first indicator that summarizes the first type of information and the third type of information;

generating a second indicator that summarizes the second type of information and the fourth type of information;

wherein the indicator is interactive to enable display of underlying information from the first type of information and the third type of information;

generating a fifth heading for aggregating the first type of information with the third type of information.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating higher level summary tablature based on lower level tablature, the system comprising:
    at least one processor configured to:
        receive a selection of at least one item contained on both a first board and a second board;
        detect a first type of information presented on the first board, the first type of information being associated with a first heading;
        detect a second type of information presented on the first board, the second type of information being associated with a second heading;
        detect a third type of information presented on the second board, the third type of information being associated with a third heading different from the first heading;
        detect a fourth type of information presented on the second board, the fourth type of information being associated with a fourth heading different from the second heading;
        analyze characteristics of the first type of information, the second type of information, the third type of information, and the fourth type of information, to ascertain that the first type of information is aggregable with the third type of information, and that the second type of information is aggregable with the fourth type of information;
        present the at least one item on a third board; and
        aggregate on the third board, in association with the at least one item, the first type of information with the third type of information, and the second type of information with the fourth type of information.

2. The system of claim 1, wherein each of the first type of information, the second type of information, the third type of information, and the fourth type of information includes associated metadata, and wherein analyzing characteristics includes analyzing the associated metadata to ascertain that the first type of information is aggregable with the third type of information, and that the second type of information is aggregable with the fourth type of information.

3. The system of claim 2, wherein the associated metadata is based on at least one of a position, a data type, a historical usage, or a logical rule.

4. The system of claim 2, wherein the at least one processor is further configured to generate a fifth heading for aggregating the first type of information with the third type of information.

5. The system of claim 1, wherein the at least one processor if further configured to generate a first indicator that summarizes the first type of information and the third type of information.

6. The system of claim 5, wherein the at least one processor is further configured to generate a second indicator that summarizes the second type of information and the fourth type of information.

7. The system of claim 6, wherein the indicator is interactive to enable display of underlying information from the first type of information and the third type of information.

8. A non-transitory computer readable medium containing instructions that when executed by at least one processor, cause the at least one processor to perform operations for generating higher level summary tablature based on lower level tablature, the operations comprising:
    receiving a selection of at least one item contained on both a first board and a second board;
    detecting a first type of information presented on the first board, the first type of information being associated with a first heading;
    detecting a second type of information presented on the first board, the second type of information being associated with a second heading;
    detecting a third type of information presented on the second board, the third type of information being associated with a third heading different from the first heading;
    detecting a fourth type of information presented on the second board, the fourth type of information being associated with a fourth heading different from the second heading;
    analyzing characteristics of the first type of information, the second type of information, the third type of information, and the fourth type of information, to ascertain that the first type of information is aggregable with the third type of information, and that the second type of information is aggregable with the fourth type of information;
    presenting the at least one item on a third board; and
    aggregating on the third board, in association with the at least one item, the first type of information with the third type of information, and the second type of information with the fourth type of information.

9. The non-transitory computer readable medium of claim 8, wherein each of the first type of information, the second type of information, the third type of information, and the fourth type of information includes associated metadata, and wherein analyzing characteristics includes analyzing the associated metadata to ascertain that the first type of information is aggregable with the third type of information, and that the second type of information is aggregable with the fourth type of information.

10. The non-transitory computer readable medium of claim 9, wherein the associated metadata is based on at least one of a position, a data type, a historical usage, or a logical rule.

11. The non-transitory computer readable medium of claim 8, wherein the operations further comprise generating a first indicator that summarizes the first type of information and the third type of information.

12. The non-transitory computer readable medium of claim 11, wherein the operations further comprise generating a second indicator that summarizes the second type of information and the fourth type of information.

13. The non-transitory computer readable medium of claim 12, wherein the indicator is interactive to enable displaying underlying information from the first type of information and the third type of information.

14. The non-transitory computer readable medium of claim 12, wherein the at least one processor is further configured to generate a fifth heading for aggregating the first type of information with the third type of information.

15. A method for generating higher level summary tablature based on lower level tablature, the method comprising:
   receiving a selection of at least one item contained on both a first board and a second board;
   detecting a first type of information presented on the first board, the first type of information being associated with a first heading;
   detecting a second type of information presented on the first board, the second type of information being associated with a second heading;
   detecting a third type of information presented on the second board, the third type of information being associated with a third heading different from the first heading;
   detecting a fourth type of information presented on the second board, the fourth type of information being associated with a fourth heading different from the second heading;
   analyzing characteristics of the first type of information, the second type of information, the third type of information, and the fourth type of information, to ascertain that the first type of information is aggregable with the third type of information, and that the second type of information is aggregable with the fourth type of information;
   presenting the at least one item on a third board; and
   aggregating on the third board, in association with the at least one item, the first type of information with the third type of information, and the second type of information with the fourth type of information.

16. The method of claim 15, wherein each of the first type of information, the second type of information, the third type of information, and the fourth type of information includes associated metadata, and wherein analyzing characteristics includes analyzing the associated metadata to ascertain that the first type of information is aggregable with the third type of information, and that the second type of information is aggregable with the fourth type of information.

17. The method of claim 16, wherein the associated metadata is based on at least one of a position, a data type, a historical usage, or a logical rule.

18. The method of claim 15, the method further comprising generating a first indicator that summarizes the first type of information and the third type of information.

19. The method of claim 18, the method further comprising generating the second type of information and the fourth type of information.

20. The method of claim 19, wherein the indicator is interactive to enable displaying underlying information from the first type of information and the third type of information.

* * * * *